(12) United States Patent
Chen et al.

(10) Patent No.: US 11,898,076 B2
(45) Date of Patent: Feb. 13, 2024

(54) CONTACT LENS AND CONTACT LENS PRODUCT

(71) Applicant: LARGAN MEDICAL CO., LTD., Taichung (TW)

(72) Inventors: Wei-Yuan Chen, Taichung (TW); Po-Tsun Chen, Taichung (TW); Wei-Chun Chen, Taichung (TW); Chun-Hung Teng, Taichung (TW)

(73) Assignee: LARGAN MEDICAL CO., LTD., Taichung (TW)

( * ) Notice: Subject to any disclaimer, the term of this patent is extended or adjusted under 35 U.S.C. 154(b) by 0 days.

(21) Appl. No.: 18/054,561

(22) Filed: Nov. 11, 2022

(65) Prior Publication Data

US 2023/0092481 A1 Mar. 23, 2023

Related U.S. Application Data

(63) Continuation of application No. 16/794,328, filed on Feb. 19, 2020, now Pat. No. 11,530,351.

(30) Foreign Application Priority Data

Mar. 28, 2019 (TW) .................................. 108111054

(51) Int. Cl.
  *G02C 7/04* (2006.01)
  *C09K 11/06* (2006.01)
  *C09B 23/10* (2006.01)

(52) U.S. Cl.
  CPC ............ *C09K 11/06* (2013.01); *C09B 23/105* (2013.01); *G02C 7/04* (2013.01); *C09K 2211/1007* (2013.01); *G02C 2202/16* (2013.01)

(58) Field of Classification Search
  CPC ............ C09K 11/06; C09K 2211/1007; C09B 23/105; C09B 23/141; G02C 7/04; G02C 7/041; G02C 7/047; G02C 7/049; G02C 7/102; G02C 7/105; G02C 7/108; G02C 2202/16
  USPC ..................................................... 351/159.24
  See application file for complete search history.

(56) References Cited

U.S. PATENT DOCUMENTS

| | | | |
|---|---|---|---|
| 4,657,363 A | 4/1987 | Neefe | |
| 6,874,888 B1 | 4/2005 | Dudai | |
| 8,153,344 B2 | 4/2012 | Faler et al. | |
| 10,444,546 B2 * | 10/2019 | Wold | G02C 7/107 |
| 11,260,612 B2 * | 3/2022 | Chauhan | B29D 11/00038 |

(Continued)

FOREIGN PATENT DOCUMENTS

| | | |
|---|---|---|
| CN | 101006156 A | 7/2007 |
| TW | M550832 U | 10/2017 |

(Continued)

*Primary Examiner* — William R Alexander
(74) *Attorney, Agent, or Firm* — McClure, Qualey & Rodack, LLP

(57) ABSTRACT

A contact lens includes at least one color changeable region, wherein the color changeable region includes at least one photoluminescence material. When a wavelength of the photoluminescence material having a maximum radiation intensity is WEmMx, an average transmittance in a wavelength range of 400 nm-700 nm of the color changeable region is T4070, a size of a total area of the color changeable region is AC, and a size of a total area of the contact lens is AL, certain conditions relating to WEmMx, T4070 and AC/AL are satisfied.

14 Claims, 19 Drawing Sheets

(56) References Cited

U.S. PATENT DOCUMENTS

| | | |
|---|---|---|
| 2003/0117576 A1 | 6/2003 | Thakrar |
| 2005/0243273 A1 | 11/2005 | Tanikawa et al. |
| 2006/0014099 A1 | 1/2006 | Faler |
| 2008/0137030 A1* | 6/2008 | Hoffman ................. G02C 7/104 351/159.63 |
| 2009/0201462 A1 | 8/2009 | Gruber |
| 2012/0123313 A1 | 5/2012 | Van Dalen |
| 2013/0032758 A1 | 2/2013 | Harding |
| 2013/0033776 A1 | 2/2013 | Harding |
| 2013/0056682 A1 | 3/2013 | Harding |
| 2013/0057824 A1 | 3/2013 | Harding |
| 2013/0062564 A1 | 3/2013 | Harding |
| 2013/0088684 A1 | 4/2013 | Harding |
| 2013/0100048 A1 | 4/2013 | Harding |
| 2013/0107201 A1 | 5/2013 | Argal et al. |
| 2014/0211447 A1 | 7/2014 | Harding |
| 2014/0220352 A1 | 8/2014 | Gross |
| 2014/0336303 A1 | 11/2014 | Harding |
| 2015/0098056 A1 | 4/2015 | Harding |
| 2017/0088771 A1 | 3/2017 | Harding |
| 2018/0113327 A1 | 4/2018 | Shak et al. |
| 2018/0239171 A1* | 8/2018 | Wold ....................... G02B 5/28 |
| 2019/0194535 A1 | 6/2019 | Harding |
| 2020/0156336 A1* | 5/2020 | Chauhan .................. G02C 7/04 |
| 2023/0251400 A1* | 8/2023 | Tsai ....................... G02B 1/115 359/642 |

FOREIGN PATENT DOCUMENTS

| | | |
|---|---|---|
| TW | 201905548 A | 2/2019 |
| WO | 2008067109 A1 | 6/2008 |

* cited by examiner

CONTACT LENS AND CONTACT LENS PRODUCT

RELATED APPLICATIONS

The present application is a Continuation of U.S. Application Ser. No. 16/794,328, filed on Feb. 19, 2020, which claims priority to Taiwan Application Serial Number 108111054, filed Mar. 28, 2019, which are incorporated by reference herein in its entirety.

BACKGROUND

Technical Field

The present disclosure relates to a contact lens and a contact lens product. More particularly, the present disclosure relates to a contact lens and a contact lens product including a photoluminescence material which can react to light rapidly.

Description of Related Art

In order to satisfy the demands for light dimming and shading, the conventional contact lens generally includes conventional photoluminescence materials. However, a light-responding speed of the conventional photoluminescence materials is not as good as predicted, and color changes thereof usually take several seconds or more. Accordingly, when an environment is changed from an outdoor place with strong light to a room with weak light, the color of the contact lens will maintain as a dark color and excessive dimming. The insufficient entering amount of light may lead to poor visibility and may further affect the safety of users.

SUMMARY

According to one aspect of the present disclosure, a contact lens includes at least one color changeable region, wherein the color changeable region includes at least one photoluminescence material. When a wavelength of the photoluminescence material having a maximum radiation intensity is WEmMx, an average transmittance in a wavelength range of 400 nm-700 nm of the color changeable region is T4070, a size of a total area of the color changeable region is AC, and a size of a total area of the contact lens is AL, the following conditions are satisfied:

400 nm≤WEmMx≤600 nm;

85%≤$T$4070; and 0.001≤$AC/AL$≤1.0.

According to another aspect of the present disclosure, a contact lens product includes the contact lens product according to the aforementioned aspect and a light-proof package, wherein the contact lens product is a daily disposable product.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
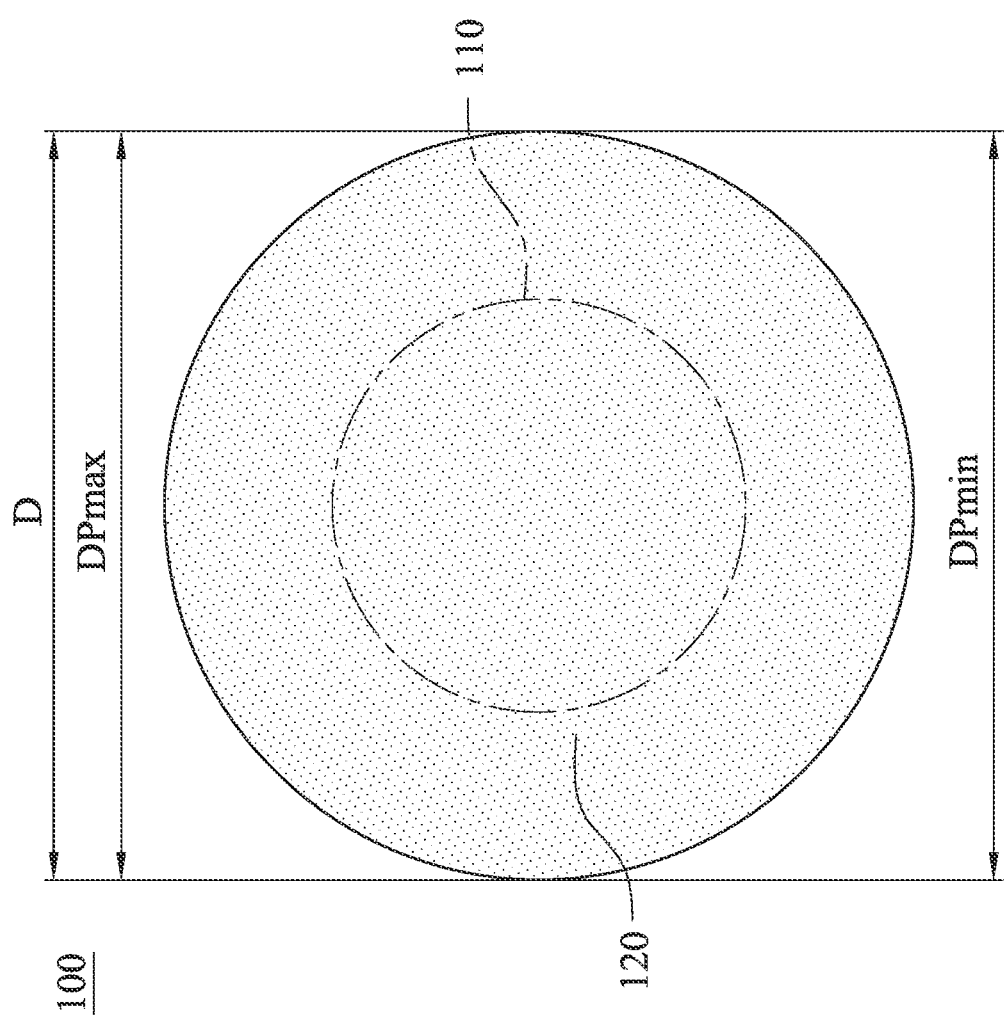
FIG. 1 is a schematic view of a contact lens according to the 1st structural embodiment of the present disclosure.

The present disclosure provides a contact lens including a color changeable region, wherein the color changeable region includes at least one photoluminescence material. In detail, when light with a proper wavelength illuminates the photoluminescence material or other substances with fluorescent properties, the molecules in the substance will absorb the energy of the light and be excited to a high energy state, and the molecules of high energy state will return to a low energy state in a very short time while releasing excess energy in the form of luminescence.

In the contact lens of the present disclose, when a wavelength of the photoluminescence material having a maximum radiation intensity is WEmMx, an average transmittance in a wavelength range of 400 nm-700 nm of the color changeable region is T4070, a size of a total area of the color changeable region is AC, and a size of a total area of the contact lens is AL, the following conditions are satisfied:

400 nm≤WEmMx≤600 nm; 85%≤T4070; and 0.001≤AC/AL≤1.0. Therefore, the color of the photoluminescence material of the contact lens of the present disclosure can quickly change after absorbing the light in a proper wavelength range within 1 second, for example, turning from yellow to green. Accordingly, the contact lens of the present disclosure can react to the light immediately and then change the color thereof correspondingly, and it is favorable for quickly responding to the change of the intensity of ambient light. Furthermore, when the photoluminescence material is arranged to cover the optical region of the contact lens, it is favorable for converting the UV light with strong energy to a light with weaker energy so as to protect the retina and reduce the damage thereto.

Furthermore, when the wavelength of the photoluminescence material having the maximum radiation intensity is WEmMx, the following condition can be satisfied: 480 nm≤WEmMx≤580 nm. Furthermore, the following condition can be satisfied: 500 nm≤WEmMx≤560 nm. Furthermore, the following condition can be satisfied: 520 nm≤WEmMx≤550 nm. Furthermore, the following condition can be satisfied: 520 nm≤WEmMx≤540 nm.

Furthermore, when the average transmittance in the wavelength range of 400 nm-700 nm of the color changeable region is T4070, the following condition can be satisfied: 40%≤4070≤94%. Furthermore, the following condition can be satisfied: 50%≤T4070≤90%. Furthermore, the following condition can be satisfied: 60%≤T4070≤89%. Furthermore, the following condition can be satisfied: 70%≤T4070≤88%.

Furthermore, when the size of the total area of the color changeable region is AC, and the size of the total area of the contact lens is AL, the following condition can be satisfied: 0.05≤AC/AL≤0.5. Therefore, it is favorable for providing a small color changeable region, so that the color changeable region can have special functions such as indication and recognition. Furthermore, the following condition can be satisfied: 0.5≤AC/AL≤1.0. Therefore, it is favorable for providing a large color changeable region, so that the color changeable region can have a wide range of color changing effects and have the effect to eliminating stray light and absorbing the UV light in the optical region. Furthermore, the following condition can be satisfied: 0.1≤AC/AL≤0.5. Furthermore, the following condition can be satisfied: 0.2≤AC/AL≤0.9. Furthermore, the following condition can be satisfied: 0.3≤AC/AL≤0.7. Furthermore, the following condition can be satisfied: 0.4≤AC/AL≤0.6.

Moreover, when a shape of the color changeable region of the present disclosure is annular, the color changeable region can be arranged as a single-annular structure or a multi-annular structure, wherein the gradient area within the multi-annular structure can be blank, or the rings of the multi-annular structure are disposed adjacent to each other directly, and a shape of an inner ring or an outer ring of the single-annular structure or the multi-annular structure can be a polygon (for example, an octagon, etc.). Furthermore, when the color changeable region of the present disclosure is a multi-annular structure, a gradient arrangement thereof can be achieved by different concentrations of photoluminescence material, wherein the color thereof can change from deep to shallow, from shallow to deep, from deep to shallow and then to deep, from shallow to deep and then to shallow, and the color also can change alternatively or leave a blank transparent portion. When the color changeable region is a single-annular structure, the color thereof also can be arranged in a gradient design and can have a function for identifying a rotating direction. Furthermore, when a shape of the color changeable region is disc-shaped, it is favorable for adjusting the dimming effect according to actual needs.

According to the contact lens of the present disclosure, the photoluminescence material can be a curcumin ((1E,6E)-1,7-Bis(4-hydroxy-3-methoxyphenyl)-1,6-heptadiene-3,5-dione) or a curcuminoid. Therefore, the photoluminescence material of the contact lens of the present disclosure has high biocompatibility and low toxicity so as to reduce the irritation and damage to eyes.

According to the contact lens of the present disclosure, the photoluminescence material can be represented by the Formula (I) or Formula (II):

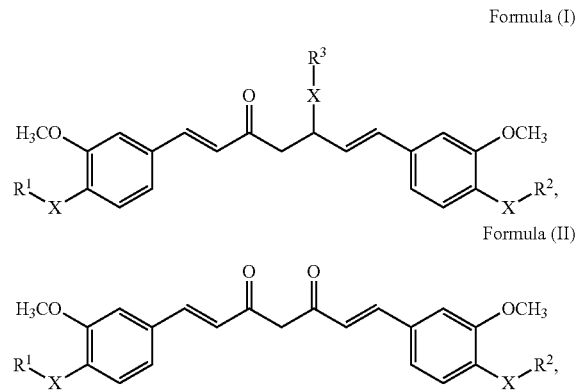

wherein each of -X-R$^1$, -X-R$^2$ and -X-R$^3$ is a side chain of the photoluminescence material, at least one of the R$^1$, R$^2$ and R$^3$ is a saturated carbon chain or an unsaturated carbon chain, X is an oxygen or a nitrogen, a carbon number of the side chain of the photoluminescence material is NC, and the following condition is satisfied: 1≤NC≤18. Therefore, it is favorable for enhancing the compatibility of the photoluminescence material in the preparation of the contact lens, so that the monomer material of the contact lens can bind to the photoluminescence material directly. Furthermore, the following condition can be satisfied: 1≤NC≤10. Therefore, the side chain with a low carbon number has a better solubility, so that it is favorable for facilitating the mutually solubility of the photoluminescence material and the material of the contact lens.

Furthermore, the following condition can be satisfied: 11≤NC≤18. Therefore, the side chain with a high carbon number has a better bonding efficiency, so that it is favorable for facilitating the bonding of the photoluminescence material to the monomer material thereof. Furthermore, when the photoluminescence material is modified (grafted), it can be molded together with the monomer material of the contact lens, so that the photoluminescence material of the finished contact lens of the present disclosure will not diffuse outside the contact lens, but the present disclosure is not limited thereto.

At least one of the R$^1$, R$^2$ and R$^3$ of the side chains of -X-R$^1$, -X-R$^2$ and -X-R$^3$ is an unsaturated carbon chain. Therefore, a better oxidizing ability can be obtained so as to increase the modification of the photoluminescence material and the bonding efficiency of monomer materials of the contact lens. Furthermore, at least one of the -X-R$^1$, -X-R$^2$ and -X-R$^3$ can include an ether group (—O—). Therefore, it is favorable for increasing the bonding compatibility between the photoluminescence material and the monomer material. Furthermore, at least one of the $-X-R^1$, $-X-R^2$ and $-X-R^3$ can include a siloxanyl group (—SiO—). Therefore, it is favorable for increasing the bonding compatibility between the photoluminescence material and the monomer of the silicon hydrogel.

According to the contact lens of the present disclosure, the contact lens can further include a metal ion, and the photoluminescence material is bonded to the metal ion so as to form a metal ion complex. The metal ion can be $Cu^{2+}$, $Fe^{3+}$ or other metal ion. Therefore, it is favorable for indicating the degree of acidity effectively according to the changes of color.

According to the contact lens of the present disclosure, the contact lens can further include an antioxidant. In detail, the fluorescence lifetime of the photoluminescence material is not affected by the intensity of the excitation light, but the addition of an antioxidant can effectively extend the usable period of the contact lens with the photoluminescence material.

According to the contact lens of the present disclosure, when a weight percentage of the photoluminescence material in the contact lens is WP, the following condition can be satisfied: $0.01\% \leq WP \leq 1.0\%$. Therefore, the absorbing effect of the photoluminescence material can be performed under the requirements of maintaining the optimal transmittance by a proper concentration of the photoluminescence material in the contact lens, so that it is favorable for reducing the damage of high energy light and enhancing the effect of the strong light elimination. Furthermore, the following condition can be satisfied: $0.05\% \leq WP \leq 0.40\%$. Furthermore, the following condition can be satisfied: $0.09\% \leq WP \leq 0.30\%$. Furthermore, the following condition can be satisfied: $0.15\% \leq WP \leq 0.25\%$.

According to the contact lens of the present disclosure, the contact lens can be made of a hydrogel or a silicon hydrogel, and the contact lens can be photocured. Therefore, it is favorable for effectively maintaining an activity of the photoluminescence material in a proper concentration thereof by a photocured method.

According to the contact lens of the present disclosure, the contact lens can include at least three lens layers, and the color changeable region can be disposed on a middle lens layer of the at least three lens layers. Therefore, it is favorable for avoiding the photoluminescence material or the pigment from leaking out of the contact lens so as to reduce the chance of contact of the chemical molecules with eyes.

According to the contact lens of the present disclosure, the color changeable region can further include at least one pigment. Therefore, the color changeable region can include a mixture of the photoluminescence material and the pigment so as to achieve different color changing type of the color changeable region according to actual needs. Furthermore, if the color changeable region is designed to be smaller than the ring of the optical region, it is favorable for reducing the stray light, and an anti-strong light effect can be obtained when that is applied to multifocal contact lens for controlling a progression of vision. Moreover, if a shape of the color changeable region is designed as disc-shaped and covered the optical region, it is favorable for blocking the strong light and providing the dimming effect as that of sunglasses. Moreover, if the color changeable region is further designed in the outer area of the non-optical region, it is favorable for adjusting the appearance of contact lens to achieve the magnification of iris. Preferably, the color of the pigment can be blue, gold, green, brown, black, gray, purple, platinum, yellow, red, pink, tan, brownish brown or orange, but the present disclosure is not limited thereto.

According to the contact lens of the present disclosure, the color changeable region can further include at least two kinds of photoluminescence material. The photoluminescence materials can be coumarin, eosin, fluorescein, green fluorescent protein, hoechst stains, phycocyanin, phycoerythrin, pyranine, rhodamine B, or TINOPAL. Therefore, it is favorable for achieving different color changing types by mixing a plurality of photoluminescence materials according to the desired effect of color changes. Furthermore, the pigment and the photoluminescence materials can be arranged in the same lens layer of the contact lens. For example, when a blue pigment is mixed with a yellow photoluminescence material, the color thereof can be black.

According to the contact lens of the present disclosure, when the size of the total area of the color changeable region is AC, the following condition can be satisfied: $5\ mm^2 \leq AC \leq 200\ mm^2$. Therefore, the range of the color changeable region can be appropriately adjusted. Furthermore, the following condition can be satisfied: $25\ mm^2 \leq AC \leq 150\ mm^2$. Furthermore, the following condition can be satisfied: $50\ mm^2 \leq AC \leq 140\ mm^2$. Furthermore, the following condition can be satisfied: $70\ mm^2 \leq AC \leq 120\ mm^2$.

According to the contact lens of the present disclosure, when a maximum diameter of the color changeable region is DPmax, the following condition can be satisfied: $1\ mm \leq DPmax \leq 16\ mm$. Therefore, a wide range of color changing effect can be provided by the color changeable region. Furthermore, the following condition can be satisfied: $3\ mm \leq DPmax \leq 14\ mm$. Furthermore, the following condition can be satisfied: $5\ mm \leq DPmax \leq 13\ mm$. Furthermore, the following condition can be satisfied: $10\ mm \leq DPmax \leq 12\ mm$.

According to the contact lens of the present disclosure, when the maximum diameter of the color changeable region is DPmax, and a diameter of the contact lens is D, the following condition can be satisfied: $0.05 \leq DPmax/D \leq 1.00$. Therefore, the area of the color changeable region can be adjusted appropriately and the color changing range thereof can be adjusted according to actual needs, so that it is favorable for providing a wide range of changing effect. Furthermore, the following condition can be satisfied: $0.05 \leq DPmax/D \leq 0.5$. Furthermore, the following condition can be satisfied: $0.2 \leq DPmax/D \leq 0.9$. Furthermore, the following condition can be satisfied: $0.3 \leq DPmax/D \leq 0.7$. Furthermore, the following condition can be satisfied: $0.4 \leq DPmax/D \leq 0.6$.

According to the contact lens of the present disclosure, when a minimum diameter of the color changeable region is DPmin, the following condition can be satisfied: $0\ mm \leq DPmin \leq 13\ mm$. Therefore, the UV light can be absorbed by the color changeable region so as to reduce the damage to eyes. Furthermore, the following condition can be satisfied: $2\ mm \leq DPmin \leq 12\ mm$. Furthermore, the following condition can be satisfied: $3\ mm \leq DPmin \leq 10\ mm$. Furthermore, the following condition can be satisfied: $5\ mm \leq DPmin \leq 8\ mm$.

According to the contact lens of the present disclosure, when the minimum diameter of the color changeable region is DPmin, and the diameter of the contact lens is D, the following condition can be satisfied: $0 \leq DPmin/D \leq 0.9$. Therefore, it is favorable for adjusting the annular region of the color changeable region according to actual needs so as to enhance the eliminating effect of the stray light. Furthermore, when the optical region is covered by the color changeable region, the UV light can be absorbed by the color changeable region so as to reduce the damage to eyes. Furthermore, the following condition can be satisfied: $0.1 \leq DPmin/D \leq 0.8$. Furthermore, the following condition can be satisfied: $0.2 \leq DPmin/D \leq 0.7$. Furthermore, the following condition can be satisfied: $0.4 \leq DPmin/D \leq 0.6$.

According to the contact lens of the present disclosure, when the maximum diameter of the color changeable region is DPmax, and the minimum diameter of the color changeable region is DPmin, the following condition can be satisfied: $0 \leq DPmax/DPmin \leq 0.99$. Therefore, it is favorable for eliminating the stray light so as to reduce the damage to eyes. Furthermore, the following condition can be satisfied: $0.1 \leq DPmax/DPmin \leq 0.9$. Furthermore, the following condition can be satisfied: $0.3 \leq DPmax/DPmin \leq 0.8$. Furthermore, the following condition can be satisfied: $0.4 \leq DPmax/DPmin \leq 0.6$.

According to the contact lens of the present disclosure, when an average transmittance in a wavelength range of 380 nm-480 nm of the color changeable region is T3848, the following condition can be satisfied: $30\% \leq T3848 \leq 90\%$. Therefore, it is favorable for adjusting the usage amount of the photoluminescence material, and the absorbing effect of the color changeable region to the visible light with shorter wavelength can be enhanced. Furthermore, the following condition can be satisfied: $50\% \leq T3848 \leq 89\%$. Furthermore, the following condition can be satisfied: $60\% \leq T3848 \leq 85\%$.

According to the contact lens of the present disclosure, when an average transmittance in a wavelength range of 280 nm-400 nm of the color changeable region is T2840, the following condition can be satisfied: $5\% \leq T2840 \leq 20\%$. Therefore, it is favorable for enhancing the absorbing effect of the color changeable region to the light with short wavelength. Furthermore, the following condition can be satisfied: $10\% \leq T2840 \leq 20\%$.

According to the contact lens of the present disclosure, when an average transmittance in a wavelength range of 300 nm-400 nm of the color changeable region is T3040, the following condition can be satisfied: $5\% \leq T3040 \leq 20\%$. Therefore, it is favorable for enhancing the absorbing effect of the color changeable region to the light with short wavelength. Furthermore, the following condition can be satisfied: $10\% \leq T3040 \leq 20\%$.

According to the contact lens of the present disclosure, when an average transmittance in a wavelength range of 380 nm-500 nm of the color changeable region is T3850, the following condition can be satisfied: $30\% \leq T3850 \leq 90\%$. Therefore, it is favorable for enhancing the absorbing effect of the color changeable region to the visible light with shorter wavelength. Furthermore, the following condition can be satisfied: $50\% \leq T3850 \leq 89\%$. Furthermore, the following condition can be satisfied: $60\% \leq T3850 \leq 85\%$.

According to the contact lens of the present disclosure, when an average transmittance in a wavelength range of 400 nm-500 nm of the color changeable region is T4050, the following condition can be satisfied: $40\% \leq T4050 \leq 94\%$. Therefore, it is favorable for enhancing the absorbing effect of the color changeable region to the blue visible light. Furthermore, the following condition can be satisfied: $50\% \leq T4050 \leq 90\%$. Furthermore, the following condition can be satisfied: $60\% \leq T4050 \leq 89\%$. Furthermore, the following condition can be satisfied: $70\% \leq T4050 \leq 88\%$.

According to the contact lens of the present disclosure, when an average transmittance in a wavelength range of 400 nm-550 nm of the color changeable region is T4055, the following condition can be satisfied: $40\% \leq T4055 \leq 94\%$. Therefore, it is favorable for enhancing the absorbing effect of the color changeable region to the blue visible light. Furthermore, the following condition can be satisfied: $50\% \leq T4055 \leq 90\%$. Furthermore, the following condition can be satisfied: $60\% \leq T4055 \leq 89\%$. Furthermore, the following condition can be satisfied: $70\% \leq T4055 \leq 88\%$.

According to the contact lens of the present disclosure, when the average transmittance in the wavelength range of 400 nm-700 nm of the color changeable region is T4070, the following condition can be satisfied: $40\% \leq T4070 \leq 94\%$. Therefore, it is favorable for enhancing the absorbing effect of the color changeable region to the visible light. Furthermore, the following condition can be satisfied: $50\% \leq T4070 \leq 90\%$. Furthermore, the following condition can be satisfied: $60\% \leq T4070 \leq 89\%$. Furthermore, the following condition can be satisfied: $70\% \leq T4070 \leq 88\%$.

According to the contact lens of the present disclosure, when an average absorbance in a wavelength range of 380 nm-500 nm of the color changeable region is A3850, the following condition can be satisfied: $0.05 \leq A3850$. Therefore, a better absorbance in a particular wavelength range of the color changeable region can be obtained so that it is favorable for exhibiting a desired color of the color changeable region of the contact lens. Furthermore, the following condition can be satisfied: $0.1 \leq A3850$. Furthermore, the following condition can be satisfied: $0.25 \leq A3850$. Furthermore, the following condition can be satisfied: $0.4 \leq A3850$.

According to the contact lens of the present disclosure, when an average absorbance in a wavelength range of 380 nm-480 nm of the color changeable region is A3848, the following condition can be satisfied: $0.05 \leq A3848$. Therefore, it is favorable for adjusting the usage amount of the photoluminescence material, and the absorbing effect of the color changeable region to the visible light with shorter wavelength can be enhanced. Furthermore, the following condition can be satisfied: $0.1 \leq A3848$. Furthermore, the following condition can be satisfied: $0.25 \leq A3848$. Furthermore, the following condition can be satisfied: $0.4 \leq A3848$.

According to the contact lens of the present disclosure, when an average absorbance in a wavelength range of 400 nm-500 nm of the color changeable region is A4050, the following condition can be satisfied: $0.05 \leq A4050$. Therefore, it is favorable for enhancing the absorbing effect of the color changeable region to the blue visible light. Furthermore, the following condition can be satisfied: $0.1 \leq A4050$. Furthermore, the following condition can be satisfied: $0.25 \leq A4050$.

According to the contact lens of the present disclosure, when an average absorbance in a wavelength range of 400 nm-550 nm of the color changeable region is A4055, the following condition can be satisfied: $0.05 \leq A4055$. Therefore, it is favorable for enhancing the absorbing effect of the color changeable region to the blue visible light. Furthermore, the following condition can be satisfied: $0.1 \leq A4055$. Furthermore, the following condition can be satisfied: $0.25 \leq A4055$.

According to the contact lens of the present disclosure, when an average absorbance in a wavelength range of 400 nm-700 nm of the color changeable region is A4070, the following condition can be satisfied: $0.05 \leq A4070 \leq 0.25$. Therefore, it is favorable for effectively balancing the absorption and transmittance of the visible light of the color changeable region. Furthermore, the following condition can be satisfied: $0.1 \leq A4070 \leq 0.20$.

According to the contact lens of the present disclosure, when an average absorbance in a wavelength range of 450 nm-650 nm of the color changeable region is A4565, the following condition can be satisfied: $A4565 \leq 0.05$. Therefore, it is favorable for maintaining a high transmittance of the green/red visible light of the color changeable region. Furthermore, the following condition can be satisfied: 0.1≤A4565.

According to the contact lens of the present disclosure, the at least one of color changeable region can be a pattern. In detail, the pattern can be words (such as "GOOD"), numbers, drawings, stripes, polygons, circles, and so on, but the present disclosure is not limited thereto. Therefore, the pattern can have directivity and representative functions, and the identification marks, expiration indications, direction identification, indicating environmental hazard status, etc., can be shown thereon.

Each of the aforementioned features of the contact lens can be utilized in various combinations for achieving the corresponding effects.

The present disclosure further provides a contact lens product including the aforementioned contact lens and a light-proof package, wherein the contact lens product is a daily disposable product. In detail, due to the luminous effect of the photoluminescence material can be faded over time after irradiating by light, the contact lens should be used within the time period that the photoluminescence material has a maximum activity so as to maintain the best shading or dimming effect. Accordingly, by the light-proof package which can completely block the light, the photoluminescence material in the contact lens can be protected and maintained so as to preserve and maintain the best shading or dimming effect for long periods of time thereof.

According to the embodiments, specific embodiments are set below and described in detail in conjunction with the drawings.

Contact Lens

The following structural embodiments of the contact lens of the present disclosure are provided so as to illustrate more detail.

1st Structural Embodiment

FIG. 1 is a schematic view of a contact lens 100 according to the 1st structural embodiment of the present disclosure. The contact lens 100 includes an optical region 110 and a color changeable region 120.

The optical region 110 is disposed on a center of the contact lens 100, a shape of the color changeable region 120 is disc-shaped, and a maximum diameter of the color changeable region 120 is larger than a maximum diameter of the optical region 110.

The color changeable region 120 includes at least one photoluminescence material. The contact lens 100 is made of a hydrogel, and the contact lens 100 is photocured. In FIG. 1, the dots of the contact lens 100 present the photoluminescence material of the color changeable region 120. However, it must be noted that the dots are used for illustrating, and the size and distribution of the dots are not used to indicate the particle size, the concentration or the type of the photoluminescence material. Therefore, the optical region 110 is covered by the photoluminescence material, so that it is favorable for converting the UV light with strong energy to a fight with weaker energy so as to protect the retina and reduce the damage thereto.

In the contact lens 100, when a size of a total area of the color changeable region 120 is AC, a size of a total area of the contact lens 100 is AL, the maximum diameter of the color changeable region 120 is DPmax, a minimum diameter of the color changeable region 120 is DPmin, and a diameter of the contact lens 100 is D, the following conditions are satisfied: AC=165 mm$^2$; AL=165 mm$^2$; DPmax=14.50 mm; DPmin=0 mm; D=14.50 mm; AC/AL=1.00 mm; DPmax/D=1.00; DPmin/D=0; and DPmin/DPmax=0.

Furthermore, the details of the photoluminescence material are the same as the aforementioned description and are not described herein.

2nd Structural Embodiment

Figure 2:
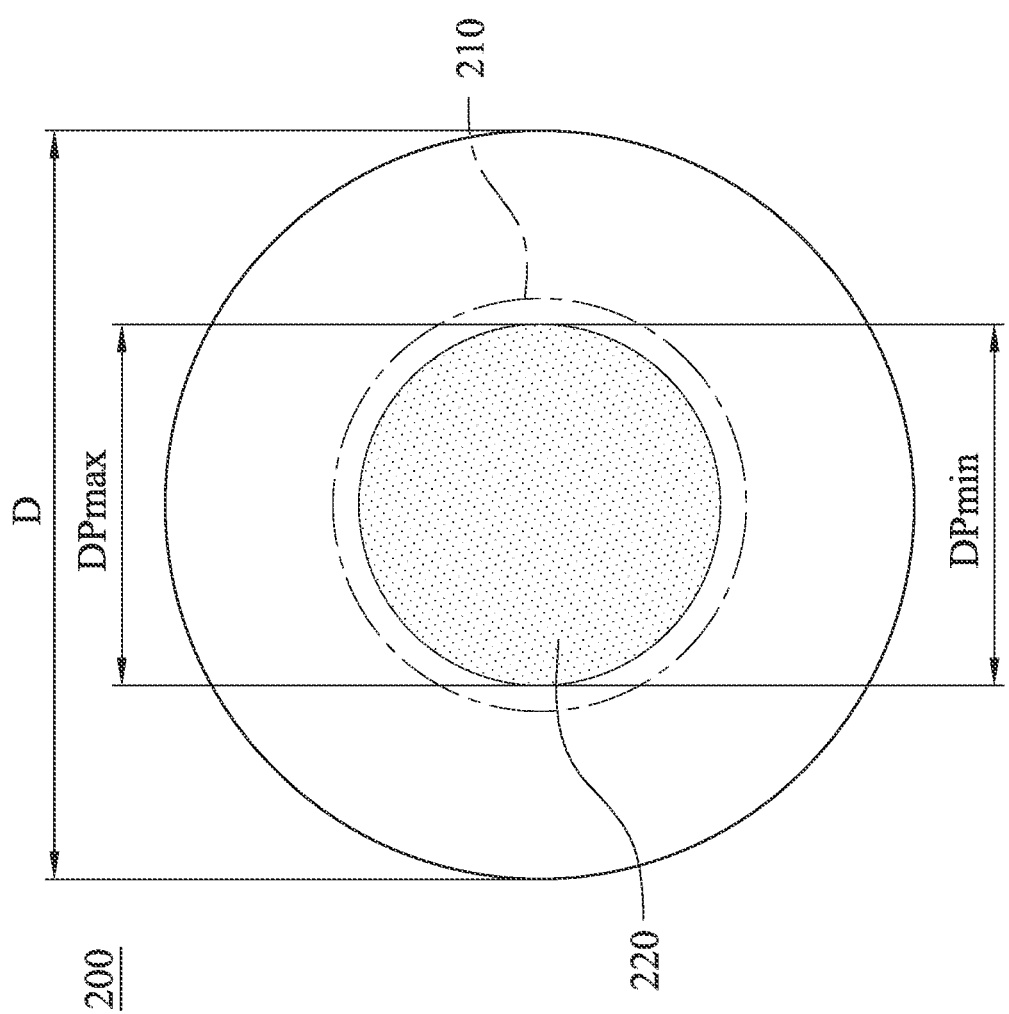
FIG. 2 is a schematic view of a contact lens according to the 2nd structural embodiment of the present disclosure.

FIG. 2 is a schematic view of a contact lens 200 according to the 2nd structural embodiment of the present disclosure. The contact lens 200 includes an optical region 210 and a color changeable region 220.

The optical region 210 is disposed on a center of the contact lens 200, a shape of the color changeable region 220 is disc-shaped and concentrically disposed with the optical region 210, and a maximum diameter of the color changeable region 220 is smaller than a maximum diameter of the optical region 210.

In the contact lens 200, the color changeable region 220 includes at least one photoluminescence material. The contact lens 200 is made of a hydrogel, and the contact lens 200 is photocured. In FIG. 2, the dots of the contact lens 200 present the photoluminescence material of the color changeable region 220, and the blank area presents the region of the contact lens 200 which is not covered by the color changeable region 220. However, it must be noted that the dots are used for illustrating, and the size and distribution of the dots are not used to indicate the particle size, the concentration or the type of the photoluminescence material. Moreover, the dots and the blank area in the following embodiments are all the same with the 1st and 2nd embodiments and are not described hereafter.

In the contact lens 200, when a size of a total area of the color changeable region 220 is AC, a size of a total area of the contact lens 200 is AL, the maximum diameter of the color changeable region 220 is DPmax, a minimum diameter of the color changeable region 220 is DPmin, and a diameter of the contact lens 200 is D, the following conditions are satisfied: AC=38 mm$^2$; AL=165 mm$^2$; DPmax=7.00 mm; DPmin=0 mm; D=14.50 mm; AC/AL=0.23 mm; DPmax/D=0.48; DPmin/D=0; and DPmin/DPmax=0.

Furthermore, the details of the photoluminescence material are the same as the aforementioned description and are not described herein.

3rd Structural Embodiment

Figure 3:
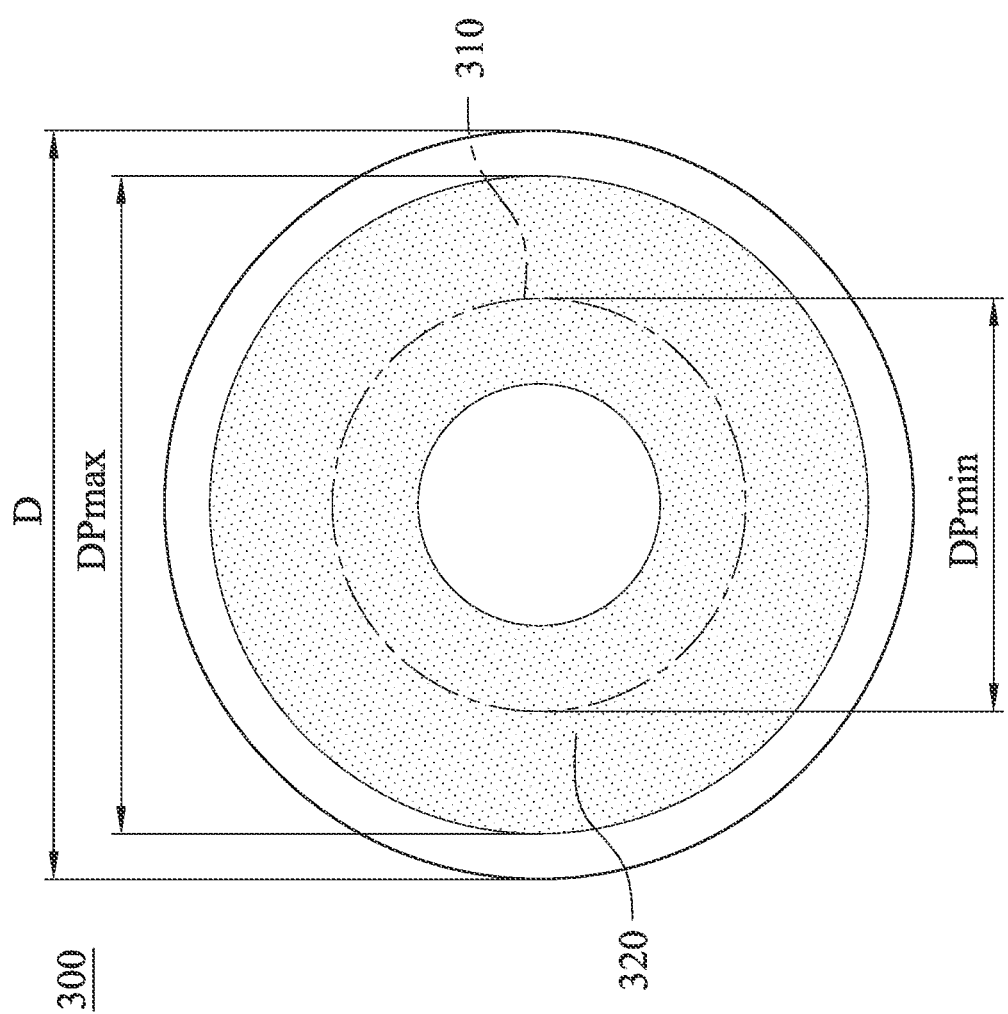
FIG. 3 is a schematic view of a contact lens according to the 3rd structural embodiment of the present disclosure.

FIG. 3 is a schematic view of a contact lens 300 according to the 3rd structural embodiment of the present disclosure. The contact lens 300 includes an optical region 310 and a color changeable region 320.

The optical region 310 is disposed on a center of the contact lens 300, and the color changeable region 320 is concentrically disposed with the optical region 310, wherein the color changeable region 320 is a single-annular structure, a maximum diameter of the color changeable region 320 is larger than a maximum diameter of the optical region 310, and a minimum diameter of the color changeable region 320 is smaller than a maximum diameter of the optical region 310.

In the contact lens 300, the color changeable region 320 includes at least one photoluminescence material (the dots in the FIG. 3 present the photoluminescence material), the contact lens 300 is made of a hydrogel, and the contact lens 300 is photocured.

In the contact lens 300, when a size of a total area of the color changeable region 320 is AC, a size of a total area of the contact lens 300 is AL, the maximum diameter of the color changeable region 320 is DPmax, the minimum diameter of the color changeable region 320 is DPmin, and a diameter of the contact lens 300 is D, the following conditions are satisfied: AC=110 mm$^2$; AL=165 mm$^2$; DPmax=12.74 mm; DPmin=4.69 mm; D=14.50 mm; AC/AL=0.67 mm; DPmax/D=0.88; DPmin/D=0.32; and DPmin/DPmax=0.37.

Furthermore, the details of the photoluminescence material are the same as the aforementioned description and are not described herein.

4th Structural Embodiment

Figure 4:
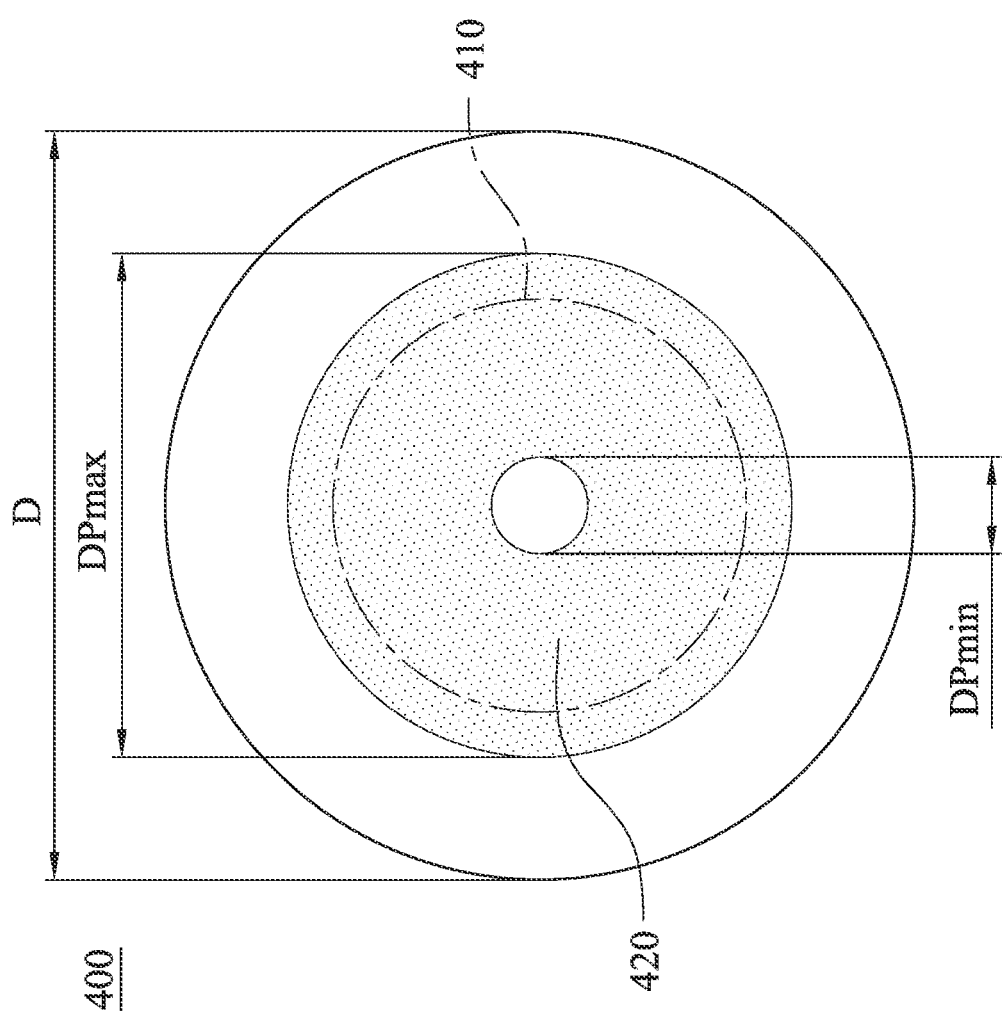
FIG. 4 is a schematic view of a contact lens according to the 4th structural embodiment of the present disclosure.

FIG. 4 is a schematic view of a contact lens 400 according to the 4th structural embodiment of the present disclosure. The contact lens 400 includes an optical region 410 and a color changeable region 420.

The optical region 410 is disposed on a center of the contact lens 400, the color changeable region 420 is concentrically disposed with the optical region 410, wherein the color changeable region 420 is a single-annular structure, a maximum diameter of the color changeable region 420 is larger than a maximum diameter of the optical region 410, and a minimum diameter of the color changeable region 420 is smaller than a maximum diameter of the optical region 410.

In the contact lens 400, the color changeable region 420 includes at least one photoluminescence material (the dots in the FIG. 4 present the photoluminescence material), the contact lens 400 is made of a hydrogel, and the contact lens 400 is photocured.

In the contact lens 400, when a size of a total area of the color changeable region 420 is AC, a size of a total area of the contact lens 400 is AL, the maximum diameter of the color changeable region 420 is DPmax, the minimum diameter of the color changeable region 420 is DPmin, and a diameter of the contact lens 400 is D, the following conditions are satisfied: AC=72 mm$^2$; AL=165 mm$^2$; DPmax=9.76 mm; DPmin=1.88 mm; D=14.50 mm; AC/AL=0.44 mm; DPmax/D=0.67; DPmin/D=0.13; and DPmin/DPmax=0.19.

Furthermore, the details of the photoluminescence material are the same as the aforementioned description and are not described herein.

5th Structural Embodiment

Figure 5:
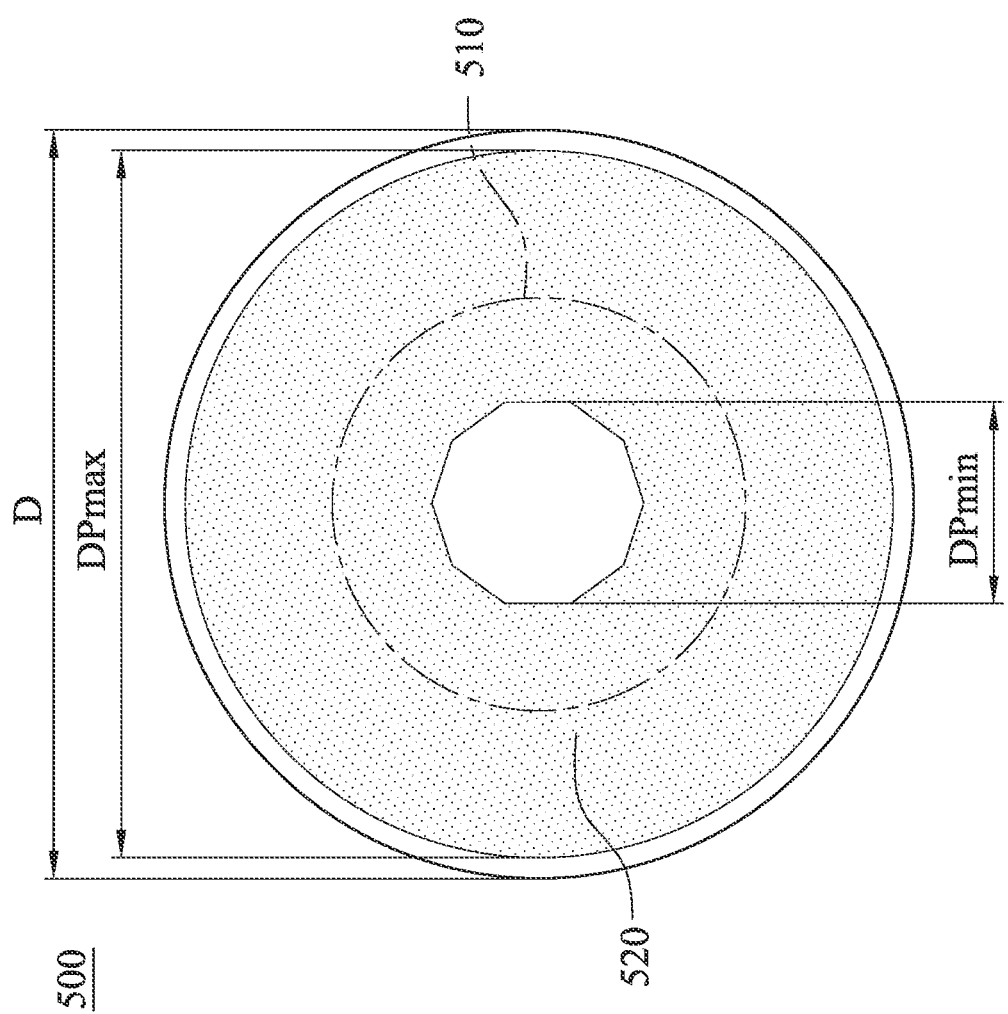
FIG. 5 is a schematic view of a contact lens according to the 5th structural embodiment of the present disclosure.

FIG. 5 is a schematic view of a contact lens 500 according to the 5th structural embodiment of the present disclosure. The contact lens 500 includes an optical region 510 and a color changeable region 520.

The optical region 510 is disposed on a center of the contact lens 500, the color changeable region 520 is concentrically disposed with the optical region 510, wherein the color changeable region 520 is a single-annular structure, a shape of an inner ring of the color changeable region 520 is a decagon, a maximum diameter of the color changeable region 520 is larger than a maximum diameter of the optical region 510, and a minimum diameter of the color changeable region 520 is smaller than a maximum diameter of the optical region 510.

In the contact lens 500, the color changeable region 520 includes at least one photoluminescence material (the dots in the FIG. 5 present the photoluminescence material), the contact lens 500 is made of a hydrogel, and the contact lens 500 is photocured.

In the contact lens 500, when a size of a total area of the color changeable region 520 is AC, a size of a total area of the contact lens 500 is AL, the maximum diameter of the color changeable region 520 is DPmax, the minimum diameter of the color changeable region 520 is DPmin, and a diameter of the contact lens 500 is D, the following conditions are satisfied: AC=135 mm$^2$; AL=165 mm$^2$; DPmax=13.70 mm; DPmin=3.90 mm; D=14.50 mm; AC/AL=0.82 mm; DPmax/D=0.94; DPmin/D=0.27; and DPmin/DPmax=0.28.

Furthermore, the details of the photoluminescence material are the same as the aforementioned description and are not described herein.

6th Structural Embodiment

Figure 6:
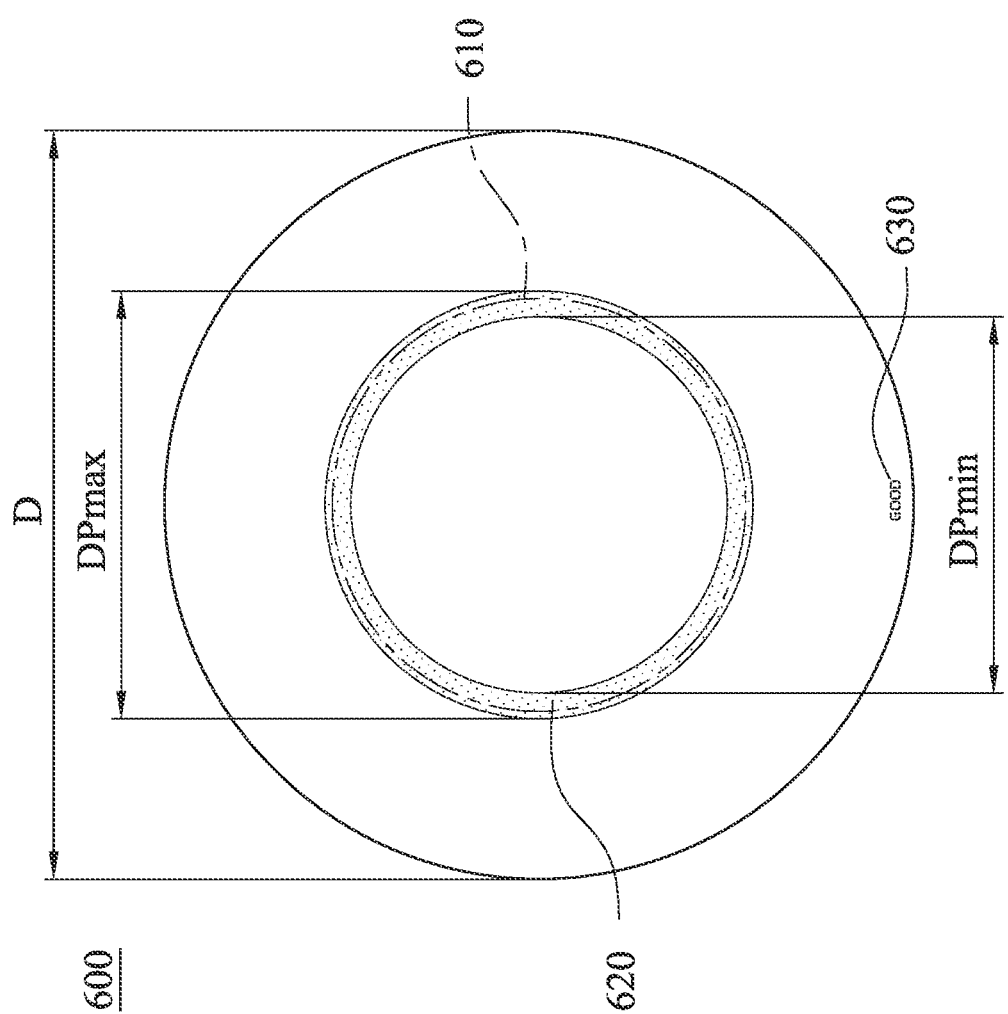
FIG. 6 is a schematic view of a contact lens according to the 6th structural embodiment of the present disclosure.

FIG. 6 is a schematic view of a contact lens 600 according to the 6th structural embodiment of the present disclosure. The contact lens 600 includes an optical region 610, a color changeable region 620, and a patterning color changeable region 630.

The optical region 610 is disposed on a center of the contact lens 600, the color changeable region 620 is concentrically disposed with the optical region 610, wherein the color changeable region 620 is a single-annular structure, a maximum diameter of the color changeable region 620 is larger than a maximum diameter of the optical region 610, a minimum diameter of the color changeable region 620 is smaller than the maximum diameter of the optical region 610, and the patterning color changeable region 630 is a word of "GOOD".

In the contact lens 600, each of the color changeable region 620 and the patterning color changeable region 630 includes at least one photoluminescence material (the dots of the color changeable region 620 of the FIG. 6 present the photoluminescence material), the contact lens 600 is made of a hydrogel, and the contact lens 600 is photocured.

In the contact lens 600, when a size of a total area of the color changeable region 620 is AC, a size of a total area of the contact lens 600 is AL, the maximum diameter of the color changeable region 620 is DPmax, the minimum diameter of the color changeable region 620 is DPmin, and a diameter of the contact lens 600 is D, the following conditions are satisfied: AC=12 mm$^2$; AL=165 mm$^2$; DPmax=8.28 mm; DPmin=7.29 mm; D=14.50 mm; AC/AL=0.08 mm; DPmax/D=0.57; DPmin/D=0.50; and DPmin/DPmax=0.88.

Furthermore, the details of the photoluminescence material are the same as the aforementioned description and are not described herein.

7th Structural Embodiment

Figure 7:
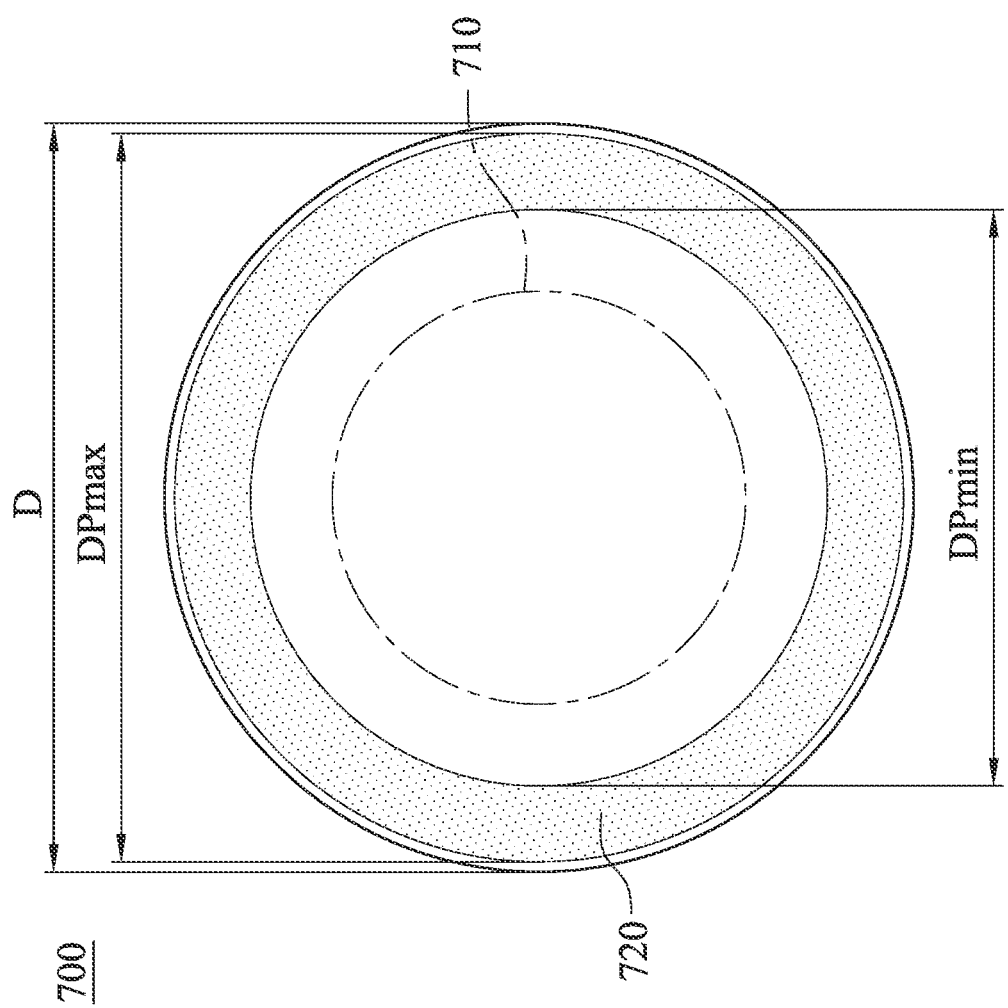
FIG. 7 is a schematic view of a contact lens according to the 7th structural embodiment of the present disclosure.

FIG. 7 is a schematic view of a contact lens 700 according to the 7th structural embodiment of the present disclosure. The contact lens 700 includes an optical region 710 and a color changeable region 720.

The optical region 710 is disposed in a center of the contact lens 700, the color changeable region 720 is concentrically disposed with the optical region 710, wherein the color changeable region 720 is a single-annular structure, and a minimum diameter of the color changeable region 720 is larger than a maximum diameter of the optical region 710.

In the contact lens 700, the color changeable region 720 includes at least one photoluminescence material (the dots of the FIG. 7 present the photoluminescence material), the contact lens 700 is made of a hydrogel, and the contact lens 700 is photocured.

In the contact lens 700, when a size of a total area of the color changeable region 720 is AC, a size of a total area of the contact lens 700 is AL, the maximum diameter of the color changeable region 720 is DPmax, a minimum diameter of the color changeable region 720 is DPmin, and a diameter of the contact lens 700 is D, the following conditions are satisfied: AC=58 mm$^2$; AL=165 mm$^2$; DPmax=14.11 mm; DPmin=11.17 mm; D=14.50 mm; AC/AL=0.35 mm; DPmax/D=0.97; DPmin/D=0.77; and DPmin/DPmax=0.79.

Furthermore, the details of the photoluminescence material are the same as the aforementioned description and are not described herein.

8th Structural Embodiment

Figure 8:
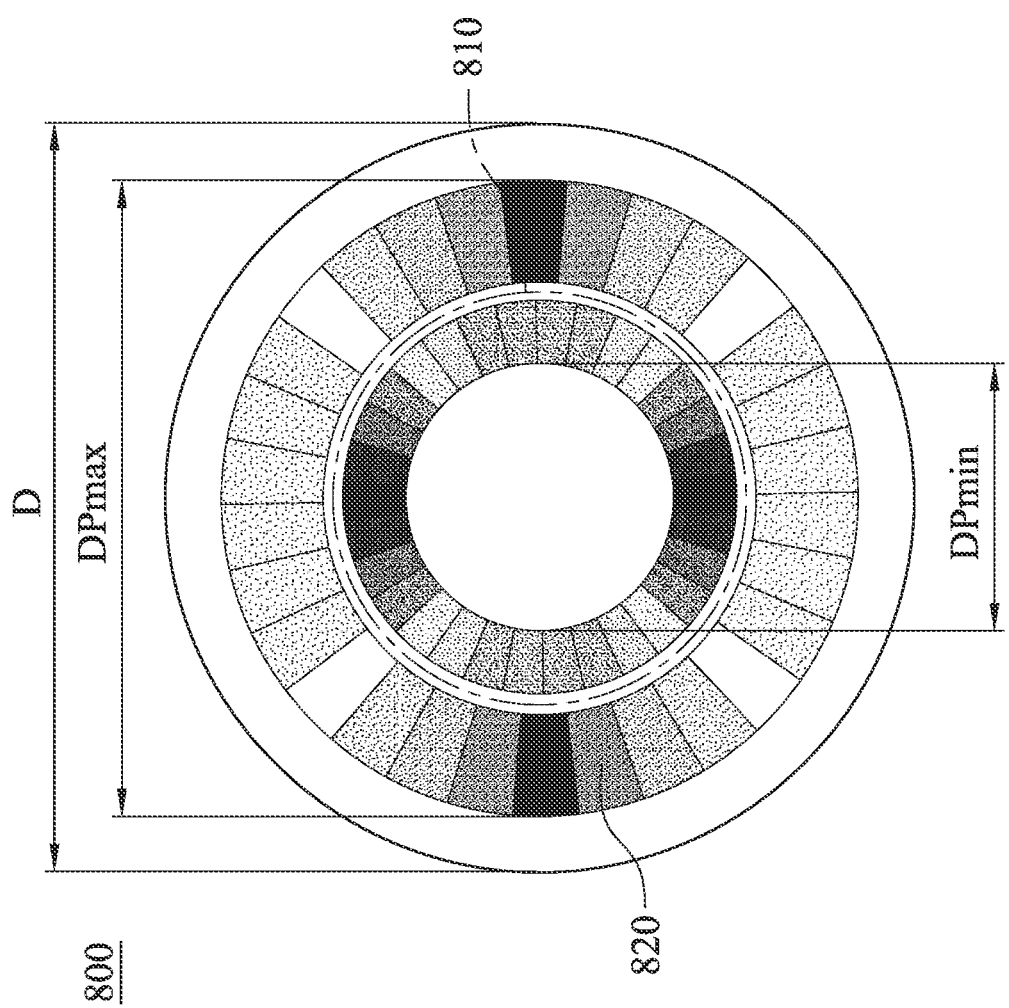
FIG. 8 is a schematic view of a contact lens according to the 8th structural embodiment of the present disclosure.

FIG. 8 is a schematic view of a contact lens 800 according to the 8th structural embodiment of the present disclosure. The contact lens 800 includes an optical region 810 and a color changeable region 820.

The optical region 810 is disposed on a center of the contact lens 800, the color changeable region 820 is concentrically disposed with the optical region 810, wherein the color changeable region 820 is a multi-annular structure, a gradient arrangement between the rings of the multi-annular structure is a blank transparent portion, the color of each of the rings of the multi-annular structure can change alternatively between deep and dark colors or is arranged as blank transparent color. A maximum diameter of the color changeable region 820 is larger than a maximum diameter of the optical region 810, and a minimum diameter of the color changeable region 820 is smaller than a maximum diameter of the optical region 810.

In the contact lens 800, the color changeable region 820 includes at least one photoluminescence material (the dots in the FIG. 8 present the photoluminescence material), the contact lens 800 is made of a hydrogel, and the contact lens 800 is photocured.

In the contact lens 800, when a size of a total area of the color changeable region 820 is AC, a size of a total area of the contact lens 800 is AL, the maximum diameter of the color changeable region 820 is DPmax, the minimum diameter of the color changeable region 820 is DPmin, and a diameter of the contact lens 800 is D, the following conditions are satisfied: AC=93 mm$^2$; AL=165 mm$^2$; DPmax=12.33 mm; DPmin=5.18 mm; D=14.50 mm; AC/AL=0.57 mm; DPmax/D=0.85; DPmin/D=0.36; and DPmin/DPmax=0.42.

Furthermore, the details of the photoluminescence material are the same as the aforementioned description and are not described herein.

9th Structural Embodiment

Figure 9:
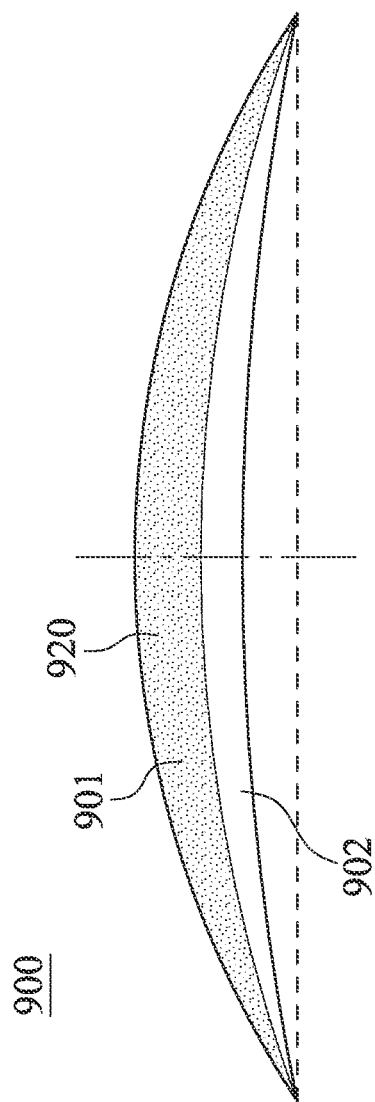
FIG. 9 is a cross-sectional view of a contact lens according to the 9th structural embodiment of the present disclosure.

FIG. 9 is a cross-sectional view of a contact lens 900 according to the 9th structural embodiment of the present disclosure. The contact lens 900 includes an optical region (not shown) and a color changeable region 920. The color changeable region 920 includes at least one photoluminescence material (the dots in the FIG. 9 present the photoluminescence material), wherein a shape of the color changeable region 920 is disc-shaped and the color changeable region 920 is concentrically disposed with the optical region. Furthermore, the details of the color changeable region are the same as the aforementioned description and are not described herein.

In FIG. 9, the contact lens 900 includes, in order from one side away from the eyeball to one side close to the eyeball, a first lens layer 901 and a second lens layer 902, and the color changeable region 920 is disposed on the first lens layer 901.

Furthermore, the details of the photoluminescence material are the same as the aforementioned description and are not described herein.

10th Structural Embodiment

Figure 10:
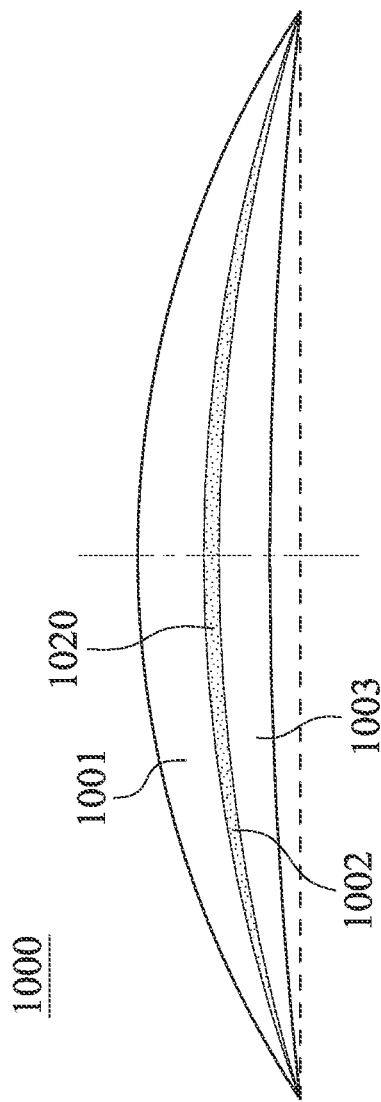
FIG. 10 is a cross-sectional view of a contact lens according to the 10th structural embodiment of the present disclosure.

FIG. 10 is a cross-sectional view of a contact lens 1000 according to the 10th structural embodiment of the present disclosure. The contact lens 1000 includes an optical region (not shown) and a color changeable region 1020. The color changeable region 1020 includes at least one photoluminescence material (the dots in the FIG. 10 present the photoluminescence material), wherein a shape of the color changeable region 1020 is disc-shaped and the color changeable region 1020 is concentrically disposed with the optical region. Furthermore, the details of the color changeable region are the same as the aforementioned description and are not described herein.

In FIG. 10, the contact lens 1000 includes, in order from one side away from the eyeball to one side close to the eyeball, a first lens layer 1001, a second lens layer 1002, and a third lens layer 1003, and the color changeable region 1020 is disposed on the second lens layer 1002 disposed in the middle.

Furthermore, the details of the photoluminescence material are the same as the aforementioned description and are not described herein.

11th Structural Embodiment

Figure 11:
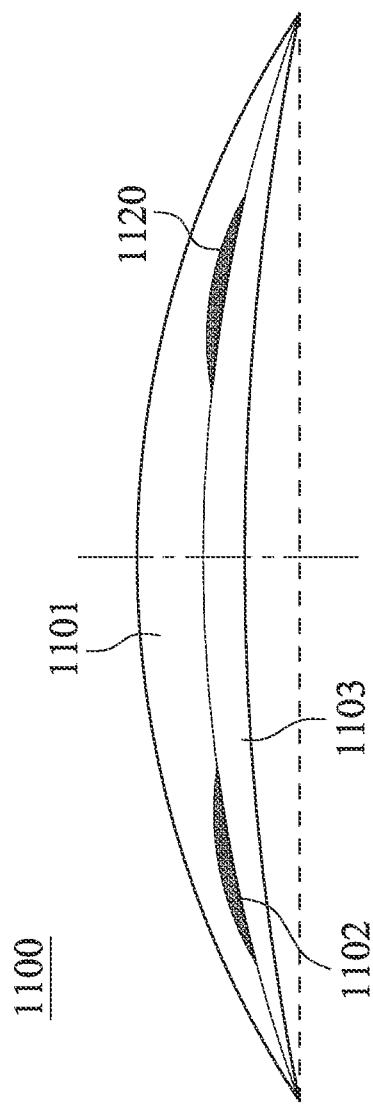
FIG. 11 is a cross-sectional view of a contact lens according to the 11th structural embodiment of the present disclosure.

FIG. 11 is a cross-sectional view of a contact lens 1100 according to the 11th structural embodiment of the present disclosure. The contact lens 1100 includes an optical region (not shown) and a color changeable region 1120. The color changeable region 1120 includes at least one photoluminescence material (the dots of the FIG. 11 present the photoluminescence material), wherein the color changeable region 1120 is a single-annular structure and is concentrically disposed with the optical region. Furthermore, the details of the color changeable region are the same as the aforementioned description and are not described herein.

In FIG. 11, the contact lens 1100 includes, in order from one side away from the eyeball to one side close to the eyeball, a first lens layer 1101, a second lens layer 1102 and a third lens layer 1103, and the color changeable region 1120 is disposed on the second lens layer 1102 disposed in the middle.

Furthermore, the details of the photoluminescence material are the same as the aforementioned description and are not described herein.

12th Structural Embodiment

Figure 12:
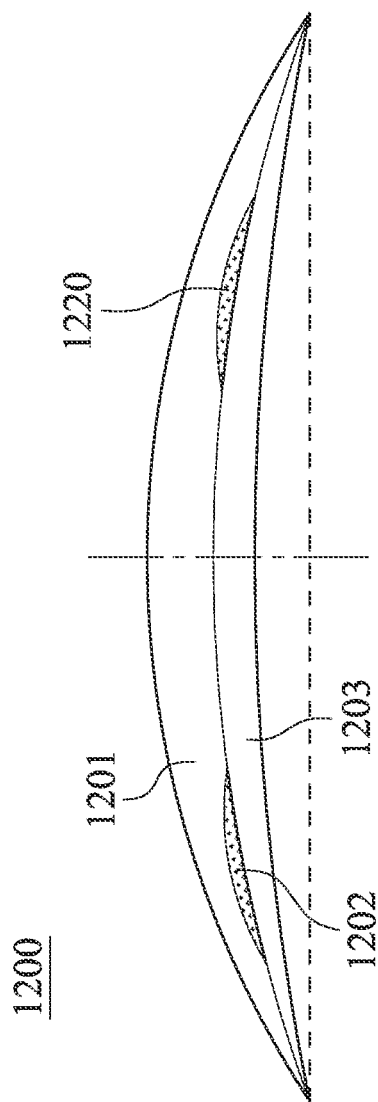
FIG. 12 is a cross-sectional view of a contact lens according to the 12th structural embodiment of the present disclosure.

FIG. 12 is a cross-sectional view of a contact lens 1200 according to the 12th structural embodiment of the present disclosure. The contact lens 1200 includes an optical region (not shown) and a color changeable region 1220. The color changeable region 1220 includes at least one photoluminescence material and a pigment (the dots in the FIG. 12 present a mixture of the photoluminescence material and the pigment), wherein the color changeable region 1220 is a single-annular structure and is concentrically disposed with the optical region. Furthermore, the details of the color changeable region are the same as the aforementioned description and are not described herein.

In FIG. 12, the contact lens 1200 includes, in order from one side away from the eyeball to one side close to the eyeball, a first lens layer 1201, a second lens layer 1202 and a third lens layer 1203, and the color changeable region 1220 is disposed on the second lens layer 1202 disposed in the middle.

Furthermore, the details of the photoluminescence material are the same as the aforementioned description and are not described herein.

13th Structural Embodiment

Figure 13:
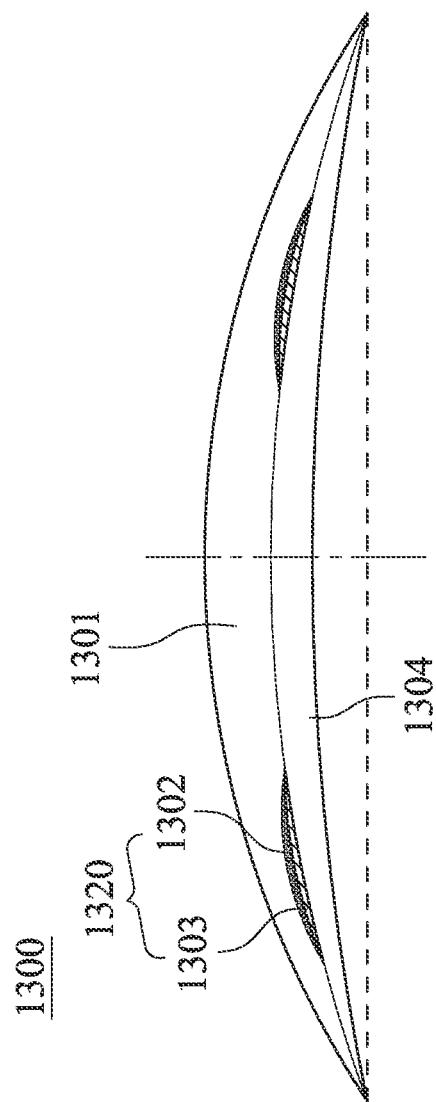
FIG. 13 is a cross-sectional view of a contact lens according to the 13th structural embodiment of the present disclosure.

FIG. 13 is a cross-sectional view of a contact lens 1300 according to the 13th structural embodiment of the present disclosure. The contact lens 1300 includes an optical region (not shown) and a color changeable region 1320. The color changeable region 1320 includes at least one photoluminescence material (the dots in the FIG. 13 present the photoluminescence material), wherein the color changeable region 1320 is a single-annular structure and is concentrically disposed with the optical region, and the color changeable region 1320 further includes a pigment. Furthermore, the details of the color changeable region are the same as the aforementioned description and are not described herein.

In FIG. 13, the contact lens 1300 includes, in order from one side away from the eyeball to one side close to the eyeball, a first lens layer 1301, a second lens layer 1302, a third lens layer 1303 and a forth lens layer 1304, wherein the color changeable region 1320 is disposed on the second lens layer 1302 and the third lens layer 1303, the photoluminescence material is arranged in the second lens layer 1302, and the pigment is arranged in the third lens layer 1303.

Furthermore, the details of the photoluminescence material are the same as the aforementioned description and are not described herein.

Photoluminescence Material

The following composition embodiments of the photoluminescence material of the contact lens of the present disclosure are provided so as to illustrate more detail.

1st Composition Embodiment

In the contact lens of the 1st composition embodiment of the present disclosure, the photoluminescence material of the contact lens can be represented by the Formula (I-1):

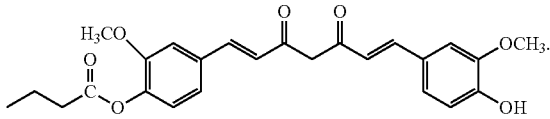

Formula (I-1)

In the 1st composition embodiment, when a carbon number of the side chain of the photoluminescence material is NC, the following condition is satisfied: NC=4.

In the 1st composition embodiment, the photoluminescence material of the contact lens can be applied to the aforementioned contact lens according to the 1st to 13th structural embodiments. The details of the contact lens according to the 1st to 13th structural embodiments are described in the aforementioned description and are not described herein.

2nd Composition Embodiment

In the 2nd composition embodiment of the present disclosure, the photoluminescence material of the contact lens can be represented by the Formula (I-2):

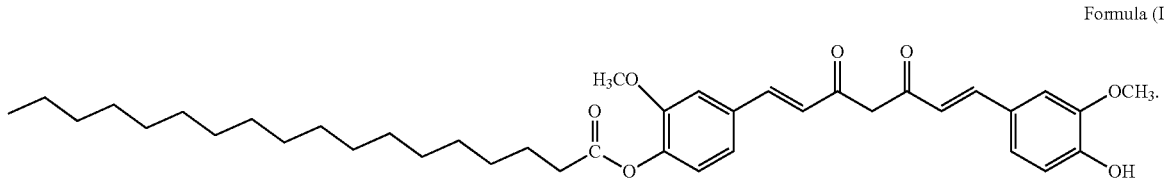

Formula (I-2)

In the 2nd composition embodiment, when a carbon number of the side chain of the photoluminescence material is NC, the following condition is satisfied: NC=18.

In the 2nd composition embodiment, the photoluminescence material of the contact lens can be applied to the aforementioned contact lens according to the 1st to 13th structural embodiments. The details of the contact lens according to the 1st to 13th structural embodiments are described in the aforementioned description and are not described herein.

3rd Composition Embodiment

In the 3rd composition embodiment of the present disclosure, the photoluminescence material of the contact lens can be represented by the Formula (I-3):

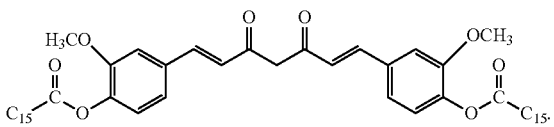

Formula (I-3)

In the 3nd composition embodiment, when a carbon number of the side chain of the photoluminescence material is NC, the following condition is satisfied: NC=16.

In the 3rd composition embodiment, the photoluminescence material of the contact lens can be applied to the aforementioned contact lens according to the 1st to 13th structural embodiments. The details of the contact lens according to the 1st to 13th structural embodiments are described in the aforementioned description and are not described herein.

4th Composition Embodiment

In the 4th composition embodiment of the present disclosure, the photoluminescence material of the contact lens can be represented by the Formula (II-1):

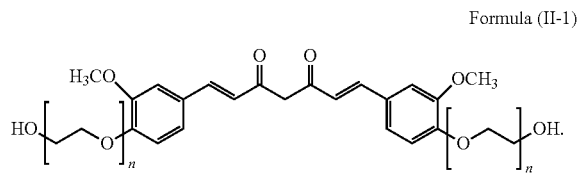

Formula (II-1)

In the 4th composition embodiment, each of -X-$R^1$ and -X-$R^2$ includes an ether group (—O—), and n is a positive integer. Furthermore, n can range from 1 to 18.

In the 4th composition embodiment, the photoluminescence material of the contact lens can be applied to the aforementioned contact lens according to the 1st to 13th structural embodiments. The details of the contact lens according to the 1st to 13th structural embodiments are described in the aforementioned description and are not described herein.

5th Composition Embodiment

In the 5th composition embodiment of the present disclosure, the photoluminescence material of the contact lens can be represented by the Formula (II-2):

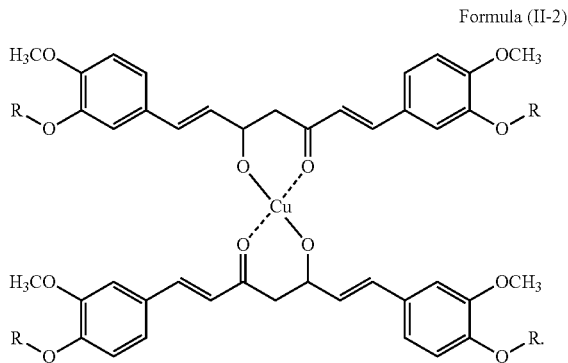

Formula (II-2)

In the 5th composition embodiment, the contact lens further include a $Cu^{2+}$ metal ion, and two molecules of the photoluminescence material are bonded to the $Cu^{2+}$ metal ion so as to form a metal ion complex.

In the 5th composition embodiment, the photoluminescence material of the contact lens can be applied to the aforementioned contact lens according to the 1st to 13th structural embodiments. The details of the contact lens according to the 1st to 13th structural embodiments are described in the aforementioned description and are not described herein.

Concentration of Photoluminescence Material

The following concentration embodiments of the contact lens including different concentration of the photoluminescence material of the present disclosure and a comparative concentration embodiment without the photoluminescence material are provided so as to illustrate more detail.

Comparative Concentration Embodiment

The comparative concentration embodiment is a contact lens without a photoluminescence material. The contact lens of the comparative concentration embodiment can be the aforementioned contact lens according to the 1st to 13th structural embodiments without the photoluminescence material thereof. The details of the contact lens according to the 1st to 13th structural embodiments are described in the aforementioned description and are not described herein.

Figure 14:
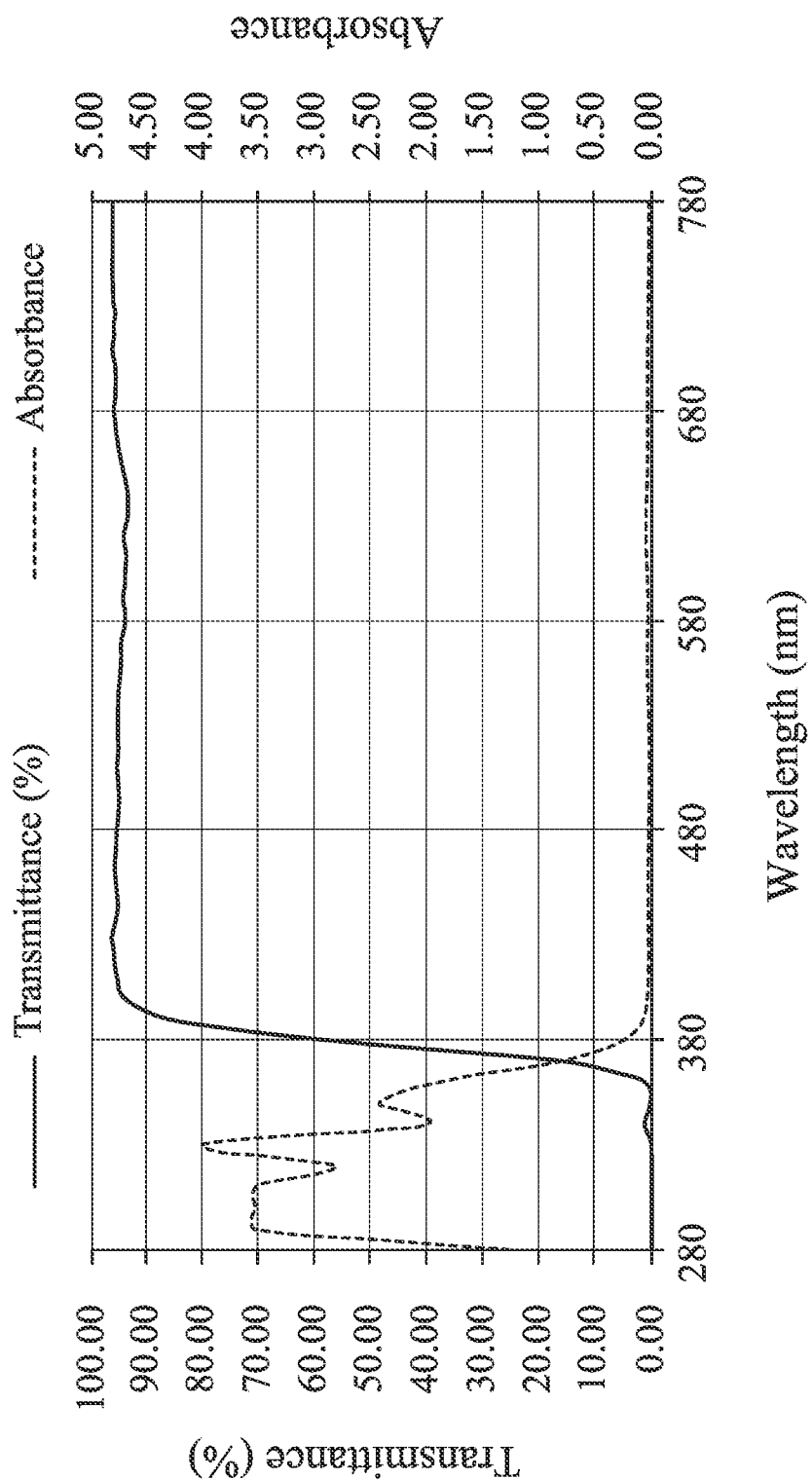
FIG. 14 is a cured diagram of the relationship between transmittance, absorbance and wavelength of the comparative concentration embodiment of the present disclosure.

FIG. 14 is a cured diagram of the relationship between transmittance, absorbance and wavelength of the comparative concentration embodiment of the present disclosure, and Table 1 shows data of transmittance and absorbance at a specific wavelength of the comparative concentration embodiment. In the comparative embodiment of the concentration, a weight percentage of the photoluminescence material in the contact lens is WP, a transmittance of the color changeable region at a specific wavelength is ITI, an absorbance of the color changeable region at a specific wavelength is A, an average transmittance in a wavelength range of 280 nm-380 nm of the color changeable region is T2838, an average transmittance in a wavelength range of 280 nm-400 nm of the color changeable region is T2840, an average transmittance in a wavelength range of 300 nm-400 nm of the color changeable region is T3040, an average transmittance in a wavelength range of 380 nm-480 nm of the color changeable region is T3848, an average transmittance in a wavelength range of 380 nm-500 nm of the color changeable region is T3850, an average transmittance in a wavelength range of 400 nm-500 nm of the color changeable region is T4050, an average transmittance in a wavelength range of 400 nm-550 nm of the color changeable region is T4055, an average transmittance in a wavelength range of 400 nm-700 nm of the color changeable region is T4070, an average transmittance in a wavelength range of 450 nm-650 nm of the color changeable region is T4565, an average transmittance in a wavelength range of 500 nm-580 nm of the color changeable region is T5058, an average transmittance in a wavelength range of 500 nm-780 nm of the color changeable region is T5078, an average transmittance in a wavelength range of 550 nm-700 nm of the color changeable region is T5570, an average transmittance in a wavelength range of 580 nm-780 nm of the color changeable region is T5878, an average absorbance in a wavelength range of 280 nm-380 nm of the color changeable region is A2838, an average absorbance in a wavelength range of 280 nm-400 nm of the color changeable region is A2840, an average absorbance in a wavelength range of 300 nm-400 nm of the color changeable region is A3040, an average absorbance in a wavelength range of 380 nm-480 nm of the color changeable region is A3848, an average absorbance in a wavelength range of 380 nm-500 nm of the color changeable region is A3850, an average absorbance in a wavelength range of 400 nm-500 nm of the color changeable region is A4050, an average absorbance in a wavelength range of 400 nm-550 nm of the color changeable region is A4055, an average absorbance in a wavelength range of 400 nm-700 nm of the color changeable region is A4070, an average absorbance in a wavelength range of 450 nm-650 nm of the color changeable region is A4565, an average absorbance in a wavelength range of 500 nm-580 nm of the color changeable region is A5058, an average absorbance in a wavelength range of 500 nm-780 nm of the color changeable region is A5078, an average absorbance in a wavelength range of 550 nm-700 nm of the color changeable region is A5570, and an average absorbance in a wavelength range of 580 nm-780 nm of the color changeable region is A5878. The definition of the transmittance and the absorbance can be calculated according to the demand wavelength ranges. For example, an average transmittance in a wavelength range of 290 nm-400 nm can be defined as T2940, and an average absorbance in the wavelength range of 290 nm-400 nm can be defined as A2940.

TABLE 1

| Photoluminescence material | Without | |
|---|---|---|
| WP (%) | 0 | |
| Wavelength (nm) | \|T\| (%) | A |
| 280 | 6.45 | 1.19 |
| 290 | 0.03 | 3.52 |
| 300 | 0.03 | 3.52 |
| 310 | 0.03 | 3.52 |
| 320 | 0.15 | 2.82 |
| 330 | 0.01 | 4.00 |
| 340 | 1.06 | 1.97 |
| 350 | 0.39 | 2.41 |
| 360 | 1.33 | 1.88 |
| 370 | 15.79 | 0.80 |
| 380 | 57.84 | 0.24 |
| 390 | 85.32 | 0.07 |
| 400 | 93.61 | 0.03 |
| 410 | 95.18 | 0.02 |
| 420 | 95.57 | 0.02 |
| 430 | 95.98 | 0.02 |
| 440 | 95.14 | 0.02 |
| 450 | 95.08 | 0.02 |
| 460 | 95.45 | 0.02 |
| 470 | 95.39 | 0.02 |
| 480 | 95.11 | 0.02 |
| 490 | 94.80 | 0.02 |
| 500 | 94.86 | 0.02 |
| 510 | 95.02 | 0.02 |
| 520 | 94.92 | 0.02 |
| 530 | 94.82 | 0.02 |
| 540 | 94.90 | 0.02 |
| 550 | 94.58 | 0.02 |
| 560 | 94.42 | 0.02 |
| 570 | 94.29 | 0.03 |
| 580 | 93.65 | 0.03 |
| 590 | 93.79 | 0.03 |
| 600 | 93.72 | 0.03 |
| 610 | 93.53 | 0.03 |
| 620 | 93.92 | 0.03 |
| 630 | 93.17 | 0.03 |
| 640 | 93.22 | 0.03 |
| 650 | 93.83 | 0.03 |
| 660 | 94.73 | 0.02 |
| 670 | 95.17 | 0.02 |
| 680 | 95.51 | 0.02 |
| 690 | 95.30 | 0.02 |
| 700 | 95.45 | 0.02 |
| 710 | 95.84 | 0.02 |
| 720 | 95.57 | 0.02 |
| 730 | 95.52 | 0.02 |
| 740 | 95.75 | 0.02 |
| 750 | 95.79 | 0.02 |
| 760 | 95.87 | 0.02 |
| 770 | 95.81 | 0.02 |
| 780 | 95.90 | 0.02 |

TABLE 1-continued

| Calculated data | |
|---|---|
| T2838 (%) | 7.67 |
| T2840 (%) | 21.30 |
| T3040 (%) | 23.23 |
| T3848 (%) | 90.88 |
| T3850 (%) | 91.49 |
| T4050 (%) | 95.11 |
| T4055 (%) | 95.03 |
| T4070 (%) | 94.65 |
| T4565 (%) | 94.40 |
| T5058 (%) | 94.61 |
| T5078 (%) | 94.79 |
| T5570 (%) | 94.27 |
| T5878 (%) | 94.81 |
| A2838 | 2.35 |
| A2840 | 2.00 |
| A3040 | 1.93 |
| A3848 | 0.05 |
| A3850 | 0.04 |
| A4050 | 0.02 |
| A4055 | 0.02 |
| A4070 | 0.02 |
| A4565 | 0.03 |
| A5058 | 0.02 |
| A5078 | 0.02 |
| A5570 | 0.03 |
| A5878 | 0.02 |

Absorbance (A) = $-\text{LOG}_{10}$ (Transmittance)

As shown in FIG. 14 and Table 1, when the color changeable region does not include the photoluminescence material, the value of T3848 of the comparative concentration embodiment is 90.88%, and the value of A3850 thereof is 0.04.

1st Concentration Embodiment

The 1st concentration embodiment is a contact lens including a photoluminescence material, and the photoluminescence material is a curcumin. The contact lens of the 1st concentration embodiment can be the aforementioned contact lens according to the 1st to 13th structural embodiments. The details of the contact lens according to the 1st to 13th structural embodiments are described in the aforementioned description and are not described herein.

Figure 15:
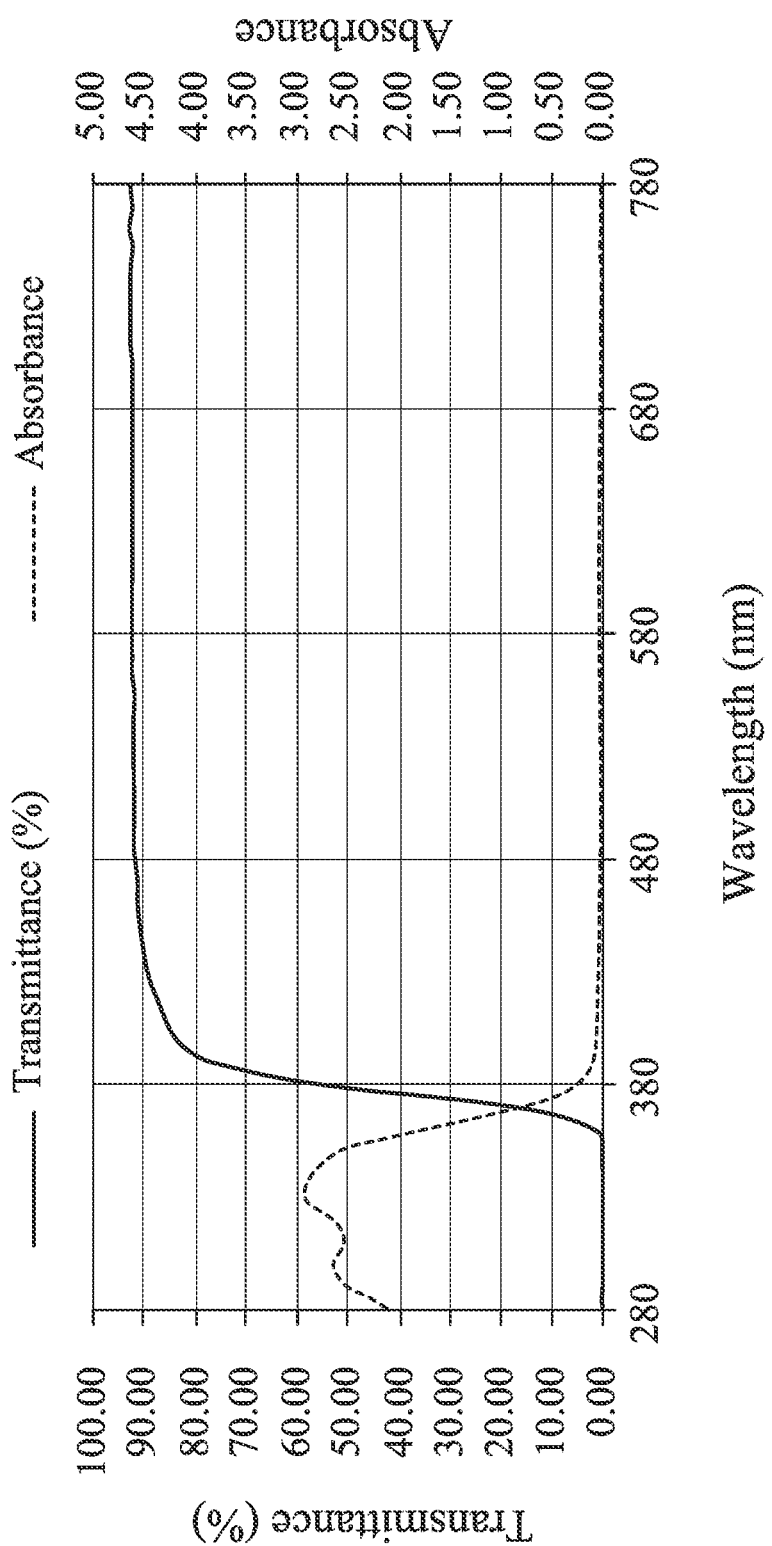
FIG. 15 is a cured diagram of the relationship between transmittance, absorbance and wavelength of the 1st concentration embodiment of the present disclosure.

FIG. 15 is a cured diagram of the relationship between transmittance, absorbance and wavelength of the 1st concentration embodiment of the present disclosure, and Table 2 shows data of transmittance and absorbance at a specific wavelength of the 1st concentration embodiment. In the 1st concentration embodiment, the definitions of the parameters WP, |T|, A, T2838, T2840, T3040, T3848, T3850, T4050, T4055, T4070, T4565, T5058, T5078, T5570, T5878, A2838, A2840, A3040, A3848, A3850, A4050, A4055, A4070, A4565, A5058, A5078, A5570 and A5878 are the same as that in the comparative concentration embodiment and are not described again.

TABLE 2

| Photoluminescence material | Curcumin | |
|---|---|---|
| WP (%) | 0.05 | |
| Wavelength (nm) | \|T\| (%) | A |
| 280 | 0.86 | 2.07 |
| 290 | 0.31 | 2.51 |
| 300 | 0.22 | 2.65 |
| 310 | 0.29 | 2.54 |
| 320 | 0.22 | 2.66 |

TABLE 2-continued

| Wavelength | |T| | A |
|---|---|---|
| 330 | 0.12 | 2.94 |
| 340 | 0.14 | 2.84 |
| 350 | 0.26 | 2.59 |
| 360 | 1.87 | 1.73 |
| 370 | 17.00 | 0.77 |
| 380 | 55.49 | 0.26 |
| 390 | 77.84 | 0.11 |
| 400 | 84.22 | 0.07 |
| 410 | 86.41 | 0.06 |
| 420 | 88.19 | 0.05 |
| 430 | 89.47 | 0.05 |
| 440 | 90.42 | 0.04 |
| 450 | 91.12 | 0.04 |
| 460 | 91.38 | 0.04 |
| 470 | 91.54 | 0.04 |
| 480 | 91.94 | 0.04 |
| 490 | 92.01 | 0.04 |
| 500 | 92.04 | 0.04 |
| 510 | 92.23 | 0.04 |
| 520 | 92.25 | 0.04 |
| 530 | 92.27 | 0.03 |
| 540 | 92.29 | 0.03 |
| 550 | 92.29 | 0.03 |
| 560 | 92.31 | 0.03 |
| 570 | 92.49 | 0.03 |
| 580 | 92.37 | 0.03 |
| 590 | 92.45 | 0.03 |
| 600 | 92.57 | 0.03 |
| 610 | 92.45 | 0.03 |
| 620 | 92.50 | 0.03 |
| 630 | 92.50 | 0.03 |
| 640 | 92.47 | 0.03 |
| 650 | 92.49 | 0.03 |
| 660 | 92.56 | 0.03 |
| 670 | 92.50 | 0.03 |
| 680 | 92.63 | 0.03 |
| 690 | 92.53 | 0.03 |
| 700 | 92.64 | 0.03 |
| 710 | 92.68 | 0.03 |
| 720 | 92.68 | 0.03 |
| 730 | 92.78 | 0.03 |
| 740 | 92.75 | 0.03 |
| 750 | 92.50 | 0.03 |
| 760 | 92.79 | 0.03 |
| 770 | 92.51 | 0.03 |
| 780 | 92.85 | 0.03 |

| Calculated data | |
|---|---|
| T2838 (%) | 6.98 |
| T2840 (%) | 18.37 |
| T3040 (%) | 21.61 |
| T3848 (%) | 85.27 |
| T3850 (%) | 86.31 |
| T4050 (%) | 89.88 |
| T4055 (%) | 90.63 |
| T4070 (%) | 91.53 |
| T4565 (%) | 92.19 |
| T5058 (%) | 92.28 |
| T5078 (%) | 92.50 |
| T5570 (%) | 92.48 |
| T5878 (%) | 92.58 |
| A2838 | 2.14 |
| A2840 | 1.83 |
| A3040 | 1.74 |
| A3848 | 0.07 |
| A3850 | 0.07 |
| A4050 | 0.05 |
| A4055 | 0.04 |
| A4070 | 0.04 |
| A4565 | 0.04 |
| A5058 | 0.03 |
| A5078 | 0.03 |
| A5570 | 0.03 |
| A5878 | 0.03 |

Absorbance (A) = $-\log_{10}$ (Transmittance)

2nd Concentration Embodiment

The 2nd concentration embodiment is a contact lens including a photoluminescence material, and the photoluminescence material is a curcumin. The contact lens of the 2nd concentration embodiment can be the aforementioned contact lens according to the 1st to 13th structural embodiments. The details of the contact lens according to the 1st to 13th structural embodiments are described in the aforementioned description and are not described herein.

Figure 16:
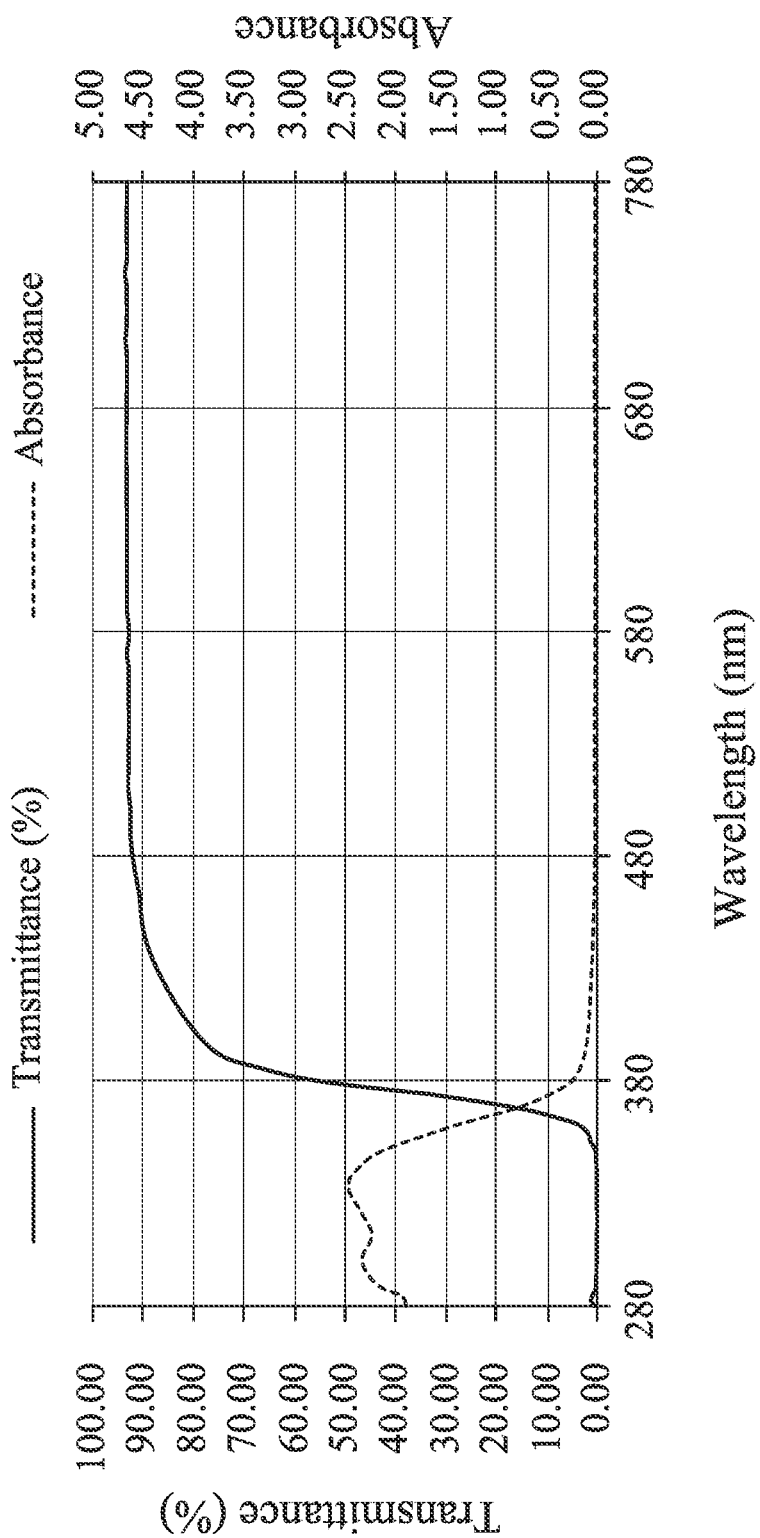
FIG. 16 is a cured diagram of the relationship between transmittance, absorbance and wavelength of the 2nd concentration embodiment of the present disclosure.

FIG. 16 is a cured diagram of the relationship between transmittance, absorbance and wavelength of the 2nd concentration embodiment of the present disclosure, and Table 3 shows data of transmittance and absorbance at a specific wavelength of the 2nd concentration embodiment. In the 2nd concentration embodiment, the definitions of the parameters WP, |T|, A, T2838, T2840, T3040, T3848, T3850, T4050, T4055, T4070, T4565, T5058, T5078, T5570, T5878, A2838, A2840, A3040, A3848, A3850, A4050, A4055, A4070, A4565, A5058, A5078, A5570 and A5878 are the same as that in the comparative concentration embodiment and not described again.

TABLE 3

| Photoluminescence material | | Curcumin |
|---|---|---|
| WP (%) | | 0.10 |
| Wavelength (nm) | |T| (%) | A |
| 280 | 1.61 | 1.79 |
| 290 | 0.62 | 2.21 |
| 300 | 0.46 | 2.33 |
| 310 | 0.56 | 2.25 |
| 320 | 0.47 | 2.33 |
| 330 | 0.33 | 2.48 |
| 340 | 0.38 | 2.42 |
| 350 | 0.82 | 2.09 |
| 360 | 3.79 | 1.42 |
| 370 | 21.24 | 0.67 |
| 380 | 55.20 | 0.26 |
| 390 | 73.31 | 0.13 |
| 400 | 79.30 | 0.10 |
| 410 | 82.40 | 0.08 |
| 420 | 85.35 | 0.07 |
| 430 | 87.67 | 0.06 |
| 440 | 89.21 | 0.05 |
| 450 | 90.32 | 0.04 |
| 460 | 91.02 | 0.04 |
| 470 | 91.67 | 0.04 |
| 480 | 92.20 | 0.04 |
| 490 | 92.62 | 0.03 |
| 500 | 92.75 | 0.03 |
| 510 | 92.92 | 0.03 |
| 520 | 93.01 | 0.03 |
| 530 | 93.10 | 0.03 |
| 540 | 93.15 | 0.03 |
| 550 | 93.19 | 0.03 |
| 560 | 93.13 | 0.03 |
| 570 | 93.36 | 0.03 |
| 580 | 93.22 | 0.03 |
| 590 | 93.38 | 0.03 |
| 600 | 93.34 | 0.03 |
| 610 | 93.36 | 0.03 |
| 620 | 93.33 | 0.03 |
| 630 | 93.39 | 0.03 |
| 640 | 93.44 | 0.03 |
| 650 | 93.32 | 0.03 |
| 660 | 93.41 | 0.03 |
| 670 | 93.30 | 0.03 |
| 680 | 93.47 | 0.03 |
| 690 | 93.37 | 0.03 |
| 700 | 93.37 | 0.03 |
| 710 | 93.59 | 0.03 |
| 720 | 93.49 | 0.03 |

TABLE 3-continued

| | | |
|---|---|---|
| 730 | 93.50 | 0.03 |
| 740 | 93.61 | 0.03 |
| 750 | 93.50 | 0.03 |
| 760 | 93.53 | 0.03 |
| 770 | 93.41 | 0.03 |
| 780 | 93.54 | 0.03 |
| Calculated data | | |
| T2838 (%) | | 7.77 |
| T2840 (%) | | 18.32 |
| T3040 (%) | | 21.44 |
| T3848 (%) | | 83.42 |
| T3850 (%) | | 84.85 |
| T4050 (%) | | 88.59 |
| T4055 (%) | | 89.99 |
| T4070 (%) | | 91.61 |
| T4565 (%) | | 92.82 |
| T5058 (%) | | 93.09 |
| T5078 (%) | | 93.33 |
| T5570 (%) | | 93.33 |
| T5878 (%) | | 93.42 |
| A2838 | | 1.84 |
| A2840 | | 1.58 |
| A3040 | | 1.50 |
| A3848 | | 0.08 |
| A3850 | | 0.08 |
| A4050 | | 0.05 |
| A4055 | | 0.05 |
| A4070 | | 0.04 |
| A4565 | | 0.03 |
| A5058 | | 0.03 |
| A5078 | | 0.03 |
| A5570 | | 0.03 |
| A5878 | | 0.03 |

Absorbance (A) = $-\text{LOG}_{10}$ (Transmittance)

3rd Concentration Embodiment

The 3rd concentration embodiment is a contact lens including a photoluminescence material, and the photoluminescence material is a curcumin. The contact lens of the 3rd concentration embodiment can be the aforementioned contact lens according to the 1st to 13th structural embodiments. The details of the contact lens according to the 1st to 13th structural embodiments are described in the aforementioned description and are not described herein.

Figure 17:
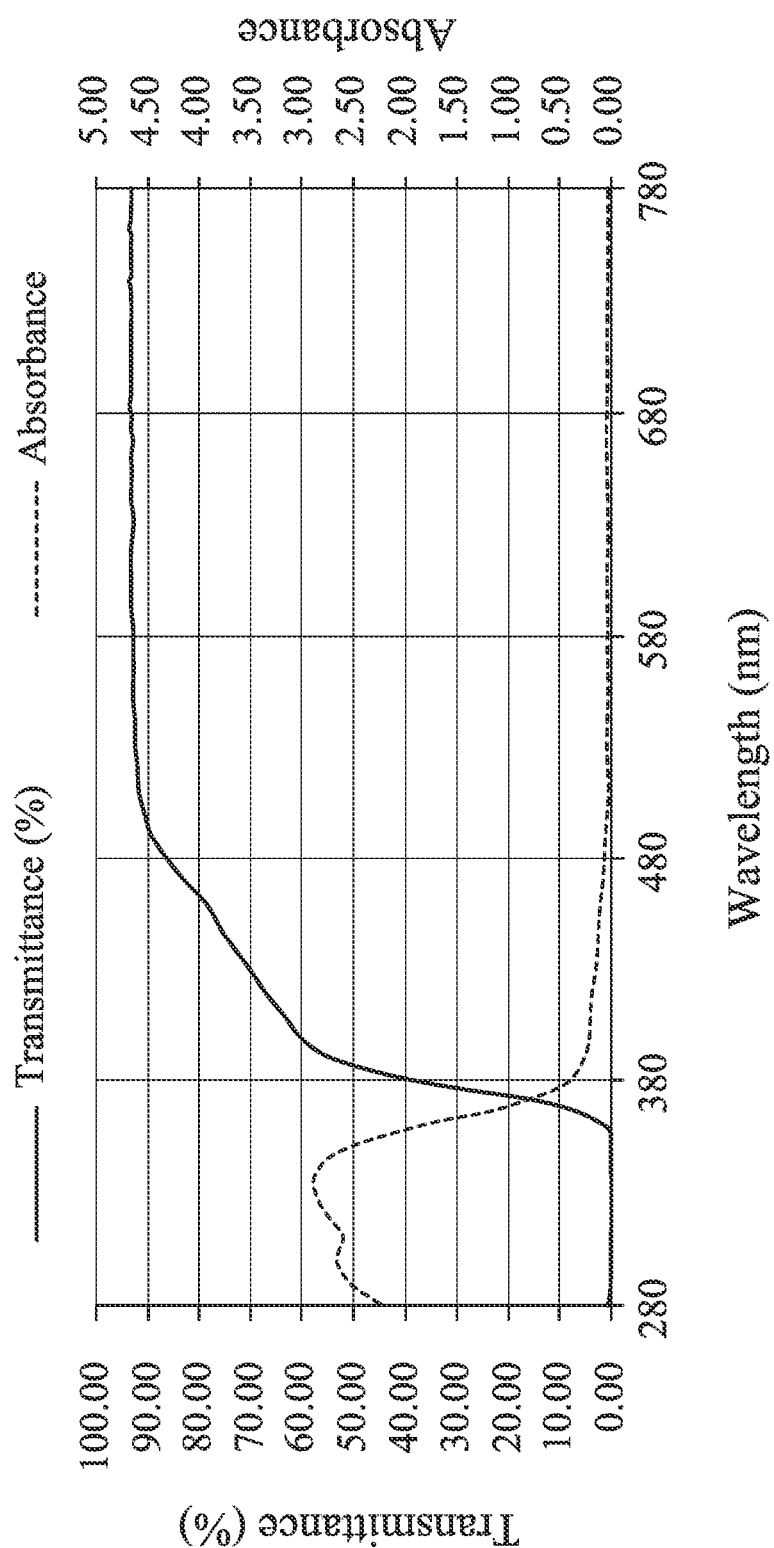
FIG. 17 is a cured diagram of the relationship between transmittance, absorbance and wavelength of the 3rd concentration embodiment of the present disclosure.

FIG. 17 is a cured diagram of the relationship between transmittance, absorbance and wavelength of the 3rd concentration embodiment of the present disclosure, and Table 4 shows data of transmittance and absorbance at a specific wavelength of the 3rd concentration embodiment. In the 3rd concentration embodiment, the definitions of the parameters WP, |T|, A, T2838, T2840, T3040, T3848, T3850, T4050, T4055, T4070, T4565, T5058, T5078, T5570, T5878, A2838, A2840, A3040, A3848, A3850, A4050, A4055, A4070, A4565, A5058, A5078, A5570 and A5878 are the same as that in the comparative concentration embodiment.

TABLE 4

| Photoluminescence material | | Curcumin |
|---|---|---|
| WP (%) | | 0.20 |
| Wavelength (nm) | |T| (%) | A |
| 280 | 0.62 | 2.21 |
| 290 | 0.29 | 2.54 |
| 300 | 0.22 | 2.67 |
| 310 | 0.24 | 2.61 |
| 320 | 0.18 | 2.76 |

TABLE 4-continued

| | | |
|---|---|---|
| 330 | 0.14 | 2.87 |
| 340 | 0.13 | 2.87 |
| 350 | 0.25 | 2.60 |
| 360 | 1.36 | 1.87 |
| 370 | 11.62 | 0.93 |
| 380 | 37.88 | 0.42 |
| 390 | 54.20 | 0.27 |
| 400 | 60.31 | 0.22 |
| 410 | 63.72 | 0.20 |
| 420 | 67.16 | 0.17 |
| 430 | 70.39 | 0.15 |
| 440 | 73.54 | 0.13 |
| 450 | 76.40 | 0.12 |
| 460 | 79.09 | 0.10 |
| 470 | 82.89 | 0.08 |
| 480 | 86.56 | 0.06 |
| 490 | 89.29 | 0.05 |
| 500 | 90.87 | 0.04 |
| 510 | 91.94 | 0.04 |
| 520 | 92.27 | 0.03 |
| 530 | 92.64 | 0.03 |
| 540 | 92.86 | 0.03 |
| 550 | 92.92 | 0.03 |
| 560 | 92.99 | 0.03 |
| 570 | 93.19 | 0.03 |
| 580 | 93.17 | 0.03 |
| 590 | 93.29 | 0.03 |
| 600 | 93.31 | 0.03 |
| 610 | 93.28 | 0.03 |
| 620 | 93.30 | 0.03 |
| 630 | 93.23 | 0.03 |
| 640 | 93.35 | 0.03 |
| 650 | 93.38 | 0.03 |
| 660 | 93.32 | 0.03 |
| 670 | 93.29 | 0.03 |
| 680 | 93.59 | 0.03 |
| 690 | 93.47 | 0.03 |
| 700 | 93.47 | 0.03 |
| 710 | 93.51 | 0.03 |
| 720 | 93.57 | 0.03 |
| 730 | 93.46 | 0.03 |
| 740 | 93.61 | 0.03 |
| 750 | 93.33 | 0.03 |
| 760 | 93.60 | 0.03 |
| 770 | 93.48 | 0.03 |
| 780 | 93.56 | 0.03 |
| Calculated data | | |
| T2838 (%) | | 4.81 |
| T2840 (%) | | 12.88 |
| T3040 (%) | | 15.14 |
| T3848 (%) | | 68.38 |
| T3850 (%) | | 71.71 |
| T4050 (%) | | 76.38 |
| T4055 (%) | | 81.43 |
| T4070 (%) | | 87.18 |
| T4565 (%) | | 90.49 |
| T5058 (%) | | 92.54 |
| T5078 (%) | | 93.15 |
| T5570 (%) | | 93.28 |
| T5878 (%) | | 93.41 |
| A2838 | | 2.21 |
| A2840 | | 1.91 |
| A3040 | | 1.83 |
| A3848 | | 0.17 |
| A3850 | | 0.16 |
| A4050 | | 0.12 |
| A4055 | | 0.09 |
| A4070 | | 0.06 |
| A4565 | | 0.04 |
| A5058 | | 0.03 |
| A5078 | | 0.03 |
| A5570 | | 0.03 |
| A5878 | | 0.03 |

Absorbance (A) = $-\text{LOG}_{10}$ (Transmittance)

Figure 18:
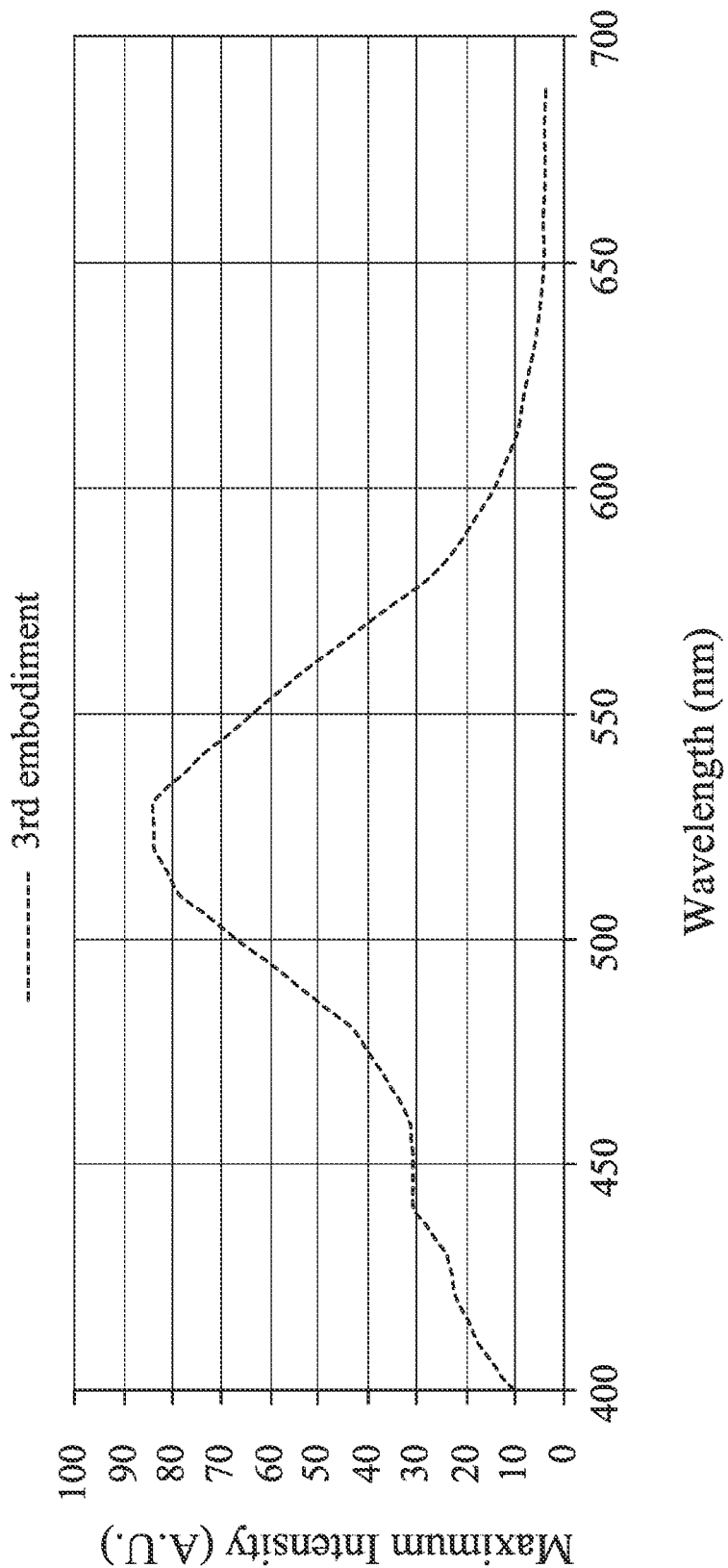
FIG. 18 is a cured diagram of the relationship between radiation intensity and wavelength of the 3rd concentration embodiment of the present disclosure.

FIG. 18 is a cured diagram of the relationship between radiation intensity and wavelength of the 3rd concentration embodiment of the present disclosure, and Table 5 shows data of the radiation intensity of the photoluminescence material at a specific wavelength of the 3rd concentration embodiment. In the 3rd concentration embodiment, a central thickness of the contact lens is CT, an average radiation intensity in a wavelength range of 400 nm-500 nm is Em4050, an average radiation intensity in a wavelength range of 400 nm-550 nm is Em4055, an average radiation intensity in a wavelength range of 400 nm-700 nm is Em4070, an average radiation intensity in a wavelength range of 450 nm-650 nm is Em4565, an average radiation intensity in a wavelength range of 500 nm-580 nm is Em5058, an average radiation intensity in a wavelength range of 500 nm-550 nm is Em5055, an average radiation intensity in a wavelength range of 520 nm-540 nm is Em5254, and an average radiation intensity in a wavelength range of 550 nm-700 nm is Em5570.

4th concentration embodiment can be the aforementioned contact lens according to the 1st to 13th structural embodiments. The details of the contact lens according to the 1st to 13th structural embodiments are described in the aforementioned description and are not described herein.

Figure 19:
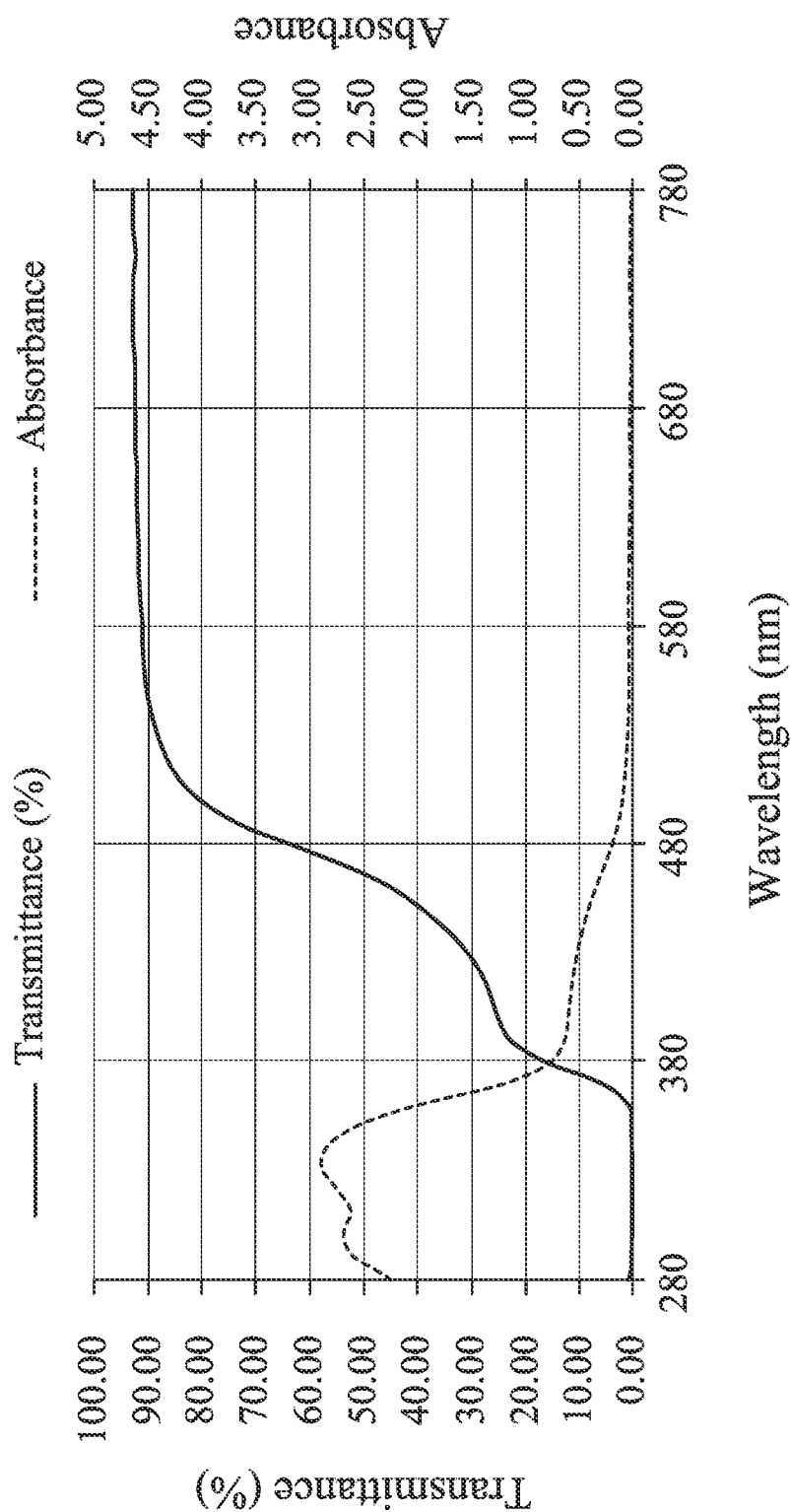
FIG. 19 is a cured diagram of the relationship between transmittance, absorbance and wavelength of the 4th concentration embodiment of the present disclosure.

FIG. 19 is a cured diagram of the relationship between transmittance, absorbance and wavelength of the 4th concentration embodiment of the present disclosure, and Table 6 shows data of transmittance and absorbance at a specific wavelength of the 4th concentration embodiment. In the 4th concentration embodiment, the definitions of the parameters WP, STI, A, T2838, T2840, T3040, T3848, T3850, T4050, T4055, T4070, T4565, T5058, T5078, T5570, T5878, A2838, A2840, A3040, A3848, A3850, A4050, A4055, A4070, A4565, A5058, A5078, A5570 and A5878 are the same as that in the comparative concentration embodiment.

TABLE 5

| Wavelength (nm) | Radiation Intensity (A.U.) |
|---|---|
| 400 | 10.71 |
| 410 | 17.57 |
| 420 | 22.1 |
| 430 | 23.8 |
| 440 | 30.66 |
| 450 | 30.72 |
| 460 | 31.93 |
| 470 | 36.88 |
| 480 | 42.74 |
| 490 | 54.49 |
| 500 | 67.38 |
| 510 | 79.16 |
| 520 | 83.89 |
| 530 | 84.32 |
| 540 | 74.85 |
| 550 | 63.8 |
| 560 | 52.15 |
| 570 | 40.36 |
| 580 | 28.13 |
| 590 | 19.61 |
| 600 | 14.31 |
| 610 | 10.24 |
| 620 | 8.36 |
| 630 | 6.331 |
| 640 | 5.177 |
| 650 | 4.052 |
| 660 | 4.375 |
| 670 | 3.615 |
| 680 | 3.901 |
| 690 | 3.842 |
| 700 | 4.209 |
| Calculated data | |
| CT (mm) | 0.084 |
| Em4050 (A.U.) | 33.54 |
| Em4055 (A.U.) | 47.19 |
| Em4070 (A.U.) | 31.09 |
| Em4565 (A.U.) | 39.95 |
| Em5058 (A.U.) | 63.78 |
| Em5055 (A.U.) | 75.57 |
| Em5254 (A.U.) | 81.02 |
| Em5570 (A.U.) | 17.03 |

As shown in FIG. 18 and Table 5, in the 3rd concentration embodiment, when the maximum radiation intensity is 84.32, a wavelength WEmMx of the photoluminescence material having a maximum radiation intensity is 530 nm.

4th Concentration Embodiment

The 4th concentration embodiment is a contact lens including a photoluminescence material, and the photoluminescence material is a curcumin. The contact lens of the

TABLE 6

| Photoluminescence material | | Curcumin |
|---|---|---|
| WP (%) | | 0.50 |
| Wavelength (nm) | \|T\| (%) | A |
| 280 | 0.65 | 2.19 |
| 290 | 0.27 | 2.57 |
| 300 | 0.21 | 2.68 |
| 310 | 0.24 | 2.63 |
| 320 | 0.19 | 2.72 |
| 330 | 0.13 | 2.89 |
| 340 | 0.15 | 2.84 |
| 350 | 0.26 | 2.58 |
| 360 | 1.02 | 1.99 |
| 370 | 6.20 | 1.21 |
| 380 | 17.08 | 0.77 |
| 390 | 23.12 | 0.64 |
| 400 | 25.11 | 0.60 |
| 410 | 26.39 | 0.58 |
| 420 | 28.04 | 0.55 |
| 430 | 30.84 | 0.51 |
| 440 | 34.59 | 0.46 |
| 450 | 39.13 | 0.41 |
| 460 | 44.89 | 0.35 |
| 470 | 53.30 | 0.27 |
| 480 | 63.93 | 0.19 |
| 490 | 73.80 | 0.13 |
| 500 | 80.47 | 0.09 |
| 510 | 84.50 | 0.07 |
| 520 | 86.83 | 0.06 |
| 530 | 88.48 | 0.05 |
| 540 | 89.60 | 0.05 |
| 550 | 90.31 | 0.04 |
| 560 | 90.72 | 0.04 |
| 570 | 91.18 | 0.04 |
| 580 | 91.24 | 0.04 |
| 590 | 91.42 | 0.04 |
| 600 | 91.66 | 0.04 |
| 610 | 91.68 | 0.04 |
| 620 | 91.81 | 0.04 |
| 630 | 91.98 | 0.04 |
| 640 | 92.06 | 0.04 |
| 650 | 92.15 | 0.04 |
| 660 | 92.36 | 0.03 |
| 670 | 92.42 | 0.03 |
| 680 | 92.49 | 0.03 |
| 690 | 92.48 | 0.03 |
| 700 | 92.57 | 0.03 |
| 710 | 92.69 | 0.03 |
| 720 | 92.70 | 0.03 |
| 730 | 92.75 | 0.03 |
| 740 | 92.85 | 0.03 |
| 750 | 92.63 | 0.03 |
| 760 | 92.84 | 0.03 |
| 770 | 92.81 | 0.03 |
| 780 | 92.91 | 0.03 |

TABLE 6-continued

| Calculated data | |
|---|---|
| T2838 (%) | 2.40 |
| T2840 | 5.74 |
| T3040 | 6.70 |
| T3848 | 35.13 |
| T3850 | 41.59 |
| T4050 | 45.50 |
| T4055 | 58.76 |
| T4070 | 74.79 |
| T4565 (%) | 81.48 |
| T5058 (%) | 88.15 |
| T5078 (%) | 91.05 |
| T5570 (%) | 91.78 |
| T5878 (%) | 92.31 |
| A2838 | 2.28 |
| A2840 | 2.02 |
| A3040 | 1.96 |
| A3848 | 0.48 |
| A3850 | 0.43 |
| A4050 | 0.38 |
| A4055 | 0.28 |
| A4070 | 0.16 |
| A4565 | 0.10 |
| A5058 | 0.06 |
| A5078 | 0.04 |
| A5570 | 0.04 |
| A5878 | 0.03 |

Absorbance (A) = $-\text{LOG}_{10}$ (Transmittance)

It must be noted that although the structural embodiment, the composition embodiment and the concentration embodiment of the present disclosure have been disclosed as above, the technical features of the embodiments can be arbitrarily combined to achieve the corresponding functions. The structural embodiment, composition embodiment and the concentration embodiment of the present disclosure are only used to illustrate the effects of the contact lens including a photoluminescence material of the present disclosure, and it is clarified hereby.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A contact lens, comprising:
at least one color changeable region, wherein the color changeable region comprises at least one photoluminescence material;
wherein a weight percentage of the photoluminescence material in the contact lens is WP, an average transmittance in a wavelength range of 400 nm-700 nm of the color changeable region is T4070, an average transmittance in a wavelength range of 280 nm-400 nm of the color changeable region is T2840, and the following conditions are satisfied:

$0.01\% \leq WP$;

$85\% \leq T4070$; and $T2840 \leq 20\%$.

2. The contact lens of claim 1, wherein the photoluminescence material is a curcumin or a curcuminoid.

3. The contact lens of claim 2, wherein the photoluminescence material is represented by Formula (I):

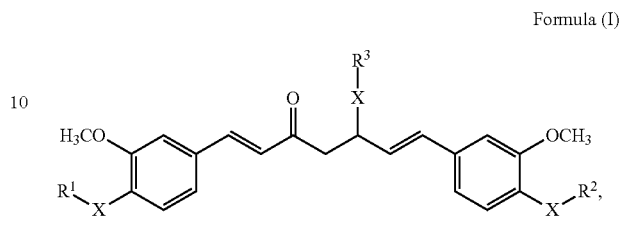

Formula (I)

wherein each of $-X-R^1$, $-X-R^2$ and $-X-R^3$ is a side chain of the photoluminescence material, at least one of the $R^1$, $R^2$ and $R^3$ is a saturated carbon chain or an unsaturated carbon chain, and X is an oxygen or a nitrogen.

4. The contact lens of claim 2, wherein the photoluminescence material is represented by Formula (II):

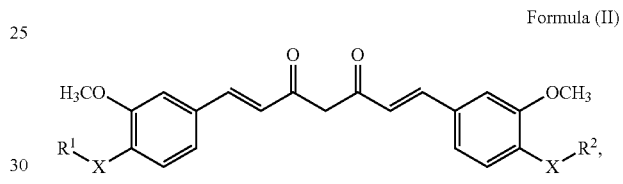

Formula (II)

wherein each of $-X-R^1$ and $-X-R^2$ is a side chain of the photoluminescence material, at least one of the $R^1$ and $R^2$ is a saturated carbon chain or an unsaturated carbon chain, and X is an oxygen or a nitrogen.

5. The contact lens of claim 1, wherein the weight percentage of the photoluminescence material in the contact lens is WP, and the following condition is satisfied:

$0.05\% \leq WP$.

6. The contact lens of claim 5, wherein the weight percentage of the photoluminescence material in the contact lens is WP, and the following condition is satisfied:

$0.1\% \leq WP$.

7. The contact lens of claim 6, wherein the weight percentage of the photoluminescence material in the contact lens is WP, and the following condition is satisfied:

$0.2\% \leq WP \leq 1.0\%$.

8. The contact lens of claim 1, wherein the average transmittance in a wavelength range of 280 nm-400 nm of the color changeable region is T2840, and the following condition is satisfied:

$10\% \leq T2840 \leq 20\%$.

9. The contact lens of claim 1, wherein a size of a total area of the color changeable region is AC, a size of a total area of the contact lens is AL, and the following condition is satisfied:

$0.001 \leq AC/AL \leq 1.0$.

10. The contact lens of claim 9, wherein the size of the total area of the color changeable region is AC, the size of the total area of the contact lens is AL, and the following condition is satisfied:

$0.2 \leq AC/AL \leq 0.7$.

11. The contact lens of claim 1, wherein a maximum diameter of the color changeable region is DPmax, a diameter of the contact lens is D, and the following condition is satisfied:

$$0.05 \leq DP\,max/D \leq 1.00.$$

12. The contact lens of claim 11, wherein a minimum diameter of the color changeable region is DPmin, the diameter of the contact lens is D, and the following condition is satisfied:

$$0 \leq DP\,min/D \leq 0.90.$$

13. The contact lens of claim 1, wherein the at least one of color changeable region is a pattern.

14. A contact lens product, comprising:
   the contact lens of claim 1; and
   a light-proof package;
   wherein the contact lens product is a daily disposable product.

* * * * *